United States Patent
Kim et al.

(10) Patent No.: US 9,734,591 B2
(45) Date of Patent: Aug. 15, 2017

(54) IMAGE DATA PROCESSING METHOD AND ELECTRONIC DEVICE SUPPORTING THE SAME

(71) Applicant: Samsung Electronics Co., Ltd., Suwon-si, Gyeonggi-do (KR)

(72) Inventors: Mi Su Kim, Chilgok-gun (KR); In Hyung Jung, Gumi-si (KR); Jeong In Choe, Gumi-si (KR); Chang Hyun Choi, Gumi-si (KR); Jong Wu Baek, Gumi-si (KR); Jeong Wook Seo, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/842,287

(22) Filed: Sep. 1, 2015

(65) Prior Publication Data
US 2016/0078291 A1    Mar. 17, 2016

(30) Foreign Application Priority Data
Sep. 2, 2014    (KR) .................. 10-2014-0116508

(51) Int. Cl.
*G06K 9/00* (2006.01)
*G06T 7/40* (2017.01)
*G06F 3/0488* (2013.01)
*G06F 3/0354* (2013.01)
*G06K 9/20* (2006.01)
*G06K 9/36* (2006.01)

(52) U.S. Cl.
CPC .......... *G06T 7/408* (2013.01); *G06F 3/03545* (2013.01); *G06F 3/04883* (2013.01);
(Continued)

(58) Field of Classification Search
CPC .......... G06K 9/00402; G06K 9/00442; G06K 9/00449; G06K 9/00456; G06K 9/00463; G06K 9/004652; G06K 9/033; G06K 9/2054; G06K 9/2063; G06K 9/3208; G06K 9/3258; G06K 9/3283; G06K 9/46; G06K 9/4638; G06K 9/6215; G06K 9/6253; G06K 9/00469; G06K 9/3233; G06K 9/3241; G06K 9/325; G06K 9/34–9/346; G06K 9/36; G06K 9/4604; G06K 9/4642–9/4652; G06K 9/62;
(Continued)

(56) References Cited

U.S. PATENT DOCUMENTS

| 6,072,941 A * | 6/2000 | Suzuki | ............... G06K 9/00456 |
| | | | 358/1.11 |
| 6,263,122 B1 * | 7/2001 | Simske | ............... G06K 9/00442 |
| | | | 382/311 |

(Continued)

FOREIGN PATENT DOCUMENTS

| KR | 2000-0025311 A | 5/2000 |
| KR | 2002-0040527 A | 5/2002 |

(Continued)

*Primary Examiner* — Jose Couso
(74) *Attorney, Agent, or Firm* — Jefferson IP Law, LLP

(57) ABSTRACT

A method of processing image data of an electronic device is provided. The method includes dividing the image data into at least one segment corresponding to a feature of at least part of the image data, determining a category corresponding to the at least one segment, and displaying the at least one segment in a converted form based on the category.

25 Claims, 26 Drawing Sheets

(52) U.S. Cl.
CPC ..... *G06K 9/00456* (2013.01); *G06K 9/00463* (2013.01); *G06K 9/2081* (2013.01); *G06K 2009/363* (2013.01)

(58) Field of Classification Search
CPC ............... G06K 9/6212–9/6252; G06K 2209/01–2209/015; G06F 3/018; G06F 3/03545; G06F 3/0482; G06F 3/04845; G06F 3/04883; G06F 7/00; G06F 7/0022; G06F 7/004; G06F 7/0081; G06F 7/0083; G06F 17/243; G06F 17/248; G06F 17/30811; G06F 17/30843; G06F 2207/10008; G06F 2207/20136; G06F 2207/20141; G06F 2207/20144; G06F 2207/30176; G06F 3/04842–3/04847; G06F 17/30247–17/3028; G06F 17/30038–17/30041; G06F 2207/02–2207/22; G06F 2207/38; G06T 3/00; G06T 7/004; G06T 7/0042; G06T 7/20; G06T 17/30256; G06T 17/30259; G06T 17/3025; G06T 17/30262; G06T 2207/10016; G06T 2207/30224; G06T 7/00–7/0004; G06T 7/10–7/168; G06T 7/60–7/68; G06T 17/00–17/05; G06T 2207/10004; H04N 1/04; H04N 1/195; H04N 1/6072; H04N 5/147; H04N 2201/0434; H04N 2201/3249; H04N 1/32101–1/32133; G06Q 20/208
See application file for complete search history.

(56) References Cited

U.S. PATENT DOCUMENTS

| | | | | |
|---|---|---|---|---|
| 6,411,731 B1 * | 6/2002 | Saito | ............ | G06K 9/2054 358/453 |
| 6,453,069 B1 * | 9/2002 | Matsugu | ............ | G06K 9/48 382/173 |
| 6,510,243 B1 * | 1/2003 | Ikeda | ............ | G06K 9/00442 358/462 |
| 7,340,092 B2 * | 3/2008 | Tanaka | ............ | G06K 9/00456 358/1.9 |
| 7,394,938 B2 * | 7/2008 | Erol | ............ | G06F 17/30256 382/218 |
| 7,446,914 B2 | 11/2008 | Yasunaga | | |
| 7,650,041 B2 | 1/2010 | Madej et al. | | |
| 7,660,468 B2 * | 2/2010 | Gokturk | ............ | G06F 17/3025 382/209 |
| 8,306,390 B2 | 11/2012 | Yoshikawa et al. | | |
| 8,509,534 B2 * | 8/2013 | Galic | ............ | G06K 9/00456 382/176 |
| 8,532,434 B2 | 9/2013 | Morimoto | | |
| 8,682,080 B2 * | 3/2014 | Soutsuka | ............ | G06K 9/3283 382/199 |
| 2002/0037104 A1 | 3/2002 | Myers et al. | | |
| 2002/0051575 A1 | 5/2002 | Myers et al. | | |
| 2002/0090115 A1 | 7/2002 | Abe et al. | | |
| 2005/0074144 A1 | 4/2005 | Abe et al. | | |
| 2005/0123200 A1 | 6/2005 | Myers et al. | | |
| 2006/0209369 A1 | 9/2006 | Yasunaga | | |
| 2008/0101726 A1 | 5/2008 | Myers et al. | | |
| 2009/0202217 A1 | 8/2009 | Yoshikawa et al. | | |
| 2010/0316295 A1 | 12/2010 | Morimoto | | |
| 2012/0127177 A1 * | 5/2012 | Kent et al. | ............ | G06T 11/206 345/440 |
| 2016/0105586 A1 * | 4/2016 | Oki | ............ | H04N 1/32459 358/2.1 |
| 2016/0224224 A1 * | 8/2016 | Seto | ............ | G06F 3/1423 |
| 2016/0371561 A1 * | 12/2016 | Jaber | ............ | G06K 9/52 |

FOREIGN PATENT DOCUMENTS

| | | |
|---|---|---|
| KR | 10-2006-0047031 A | 5/2006 |
| KR | 10-2012-0074702 A | 7/2012 |
| WO | 2007/100491 A1 | 9/2007 |

* cited by examiner

TIM KANG
555-5000
call him at 2pm

FIG.8

STARS AND GALAXIES

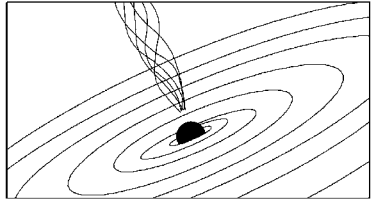

LATEST NEWS

NASA's NuSTAR Sees Rare Blurring of Black Hole Light
A supermassive black hole is grabbing and stretching light to an extreme degree never seen before.

Black Hole Jets Make Shock Waves
A composite image of the spiral galaxy NGC 4258 showing X-ray emission observed with NASA's Chandra X-ray Observatory (blue) and infrared emission observed with NASA's Spitzer Space Telescope (red and green).

Astrophysics Missions

Galaxy Evolution Explorer
Uses ultraviolet wavelengths to measure the history of star formation 80 percent of the way back to the Big Bang.

Exoplanet
Updates, documents, and in-depth information about NASA's Exoplanet Exploration Program.

Keck Interferometer
Links two 10-meter (33-foot) telescopes, which form the world's most powerful optical telescope system.

Kepler Mission
The Kepler Mission will search for Earth-like planets with the "transit" method.

Palomar Observatory
A joint effort between JPL and the California Institute of Technology, the Palomar Observatory houses a collection of famous telescopes

News & Features

Spitzer Telescope Honored by Aerospace Society
NASA's Spitzer Space Telescope has received the 2014 AIAA Space Science Award for its ongoing infrared studies of the hidden cosmos.

NuSTAR Celebrates Two Years of Science in Space
NuSTAR's next two years in space will see more revelations about black holes and extremely energetic objects

The Most Precise Measurement of an Alien World's Size
NASA's Kepler and Spitzer space telescopes have made the most precise measurement yet of the size of a planet beyond our solar system.

360-Degree View of the Milky Way
This video shows a continually-looping infrared view of our Milky Way galaxy, as seen by NASA's Spitzer Space Telescope.

Sloshing Stat Goes Supernova

FIG.12A

IMAGE DATA PROCESSING METHOD AND ELECTRONIC DEVICE SUPPORTING THE SAME

CROSS-REFERENCE TO RELATED APPLICATION(S)

This application claims the benefit under 35 U.S.C. §119 (a) of a Korean patent application filed on Sep. 2, 2014 in the Korean Intellectual Property Office and assigned Serial number 10-2014-0116508, the entire disclosure of which is hereby incorporated by reference.

TECHNICAL FIELD

The present disclosure relates to an image data processing method and an electronic device supporting the same.

BACKGROUND

An electronic device may recognize characters from an image captured through an image sensor and may add a contact to an address book based on the recognized characters.

An existing electronic device may have a high character recognition accuracy of a standardized character but have a low character recognition accuracy of a non-standardized character or a handwriting generated data, each frequently being recognized as a pure image. Additionally, an existing electronic device may not edit character data in the case of character recognized data or handwriting generated and recognized data.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an image data processing method and an electronic device supporting the same.

In accordance with an aspect of the present disclosure, a method of processing image data of an electronic device is provided. The method includes dividing the image data into at least one segment corresponding to a feature of at least part of the image data, determining a category corresponding to the at least one segment, and displaying the at least one segment in a converted form based on the category.

In accordance with another aspect of the present disclosure, an electronic device is provided. The electronic device includes at least one processor configured to divide image data into at least one segment corresponding to a feature of at least part of the image data, to determine a category corresponding to the at least one segment, and to display the at least one segment in a converted form based on the category, and a display configured to display the image data in a converted form.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 8 is a view illustrating a method of determining stroke information of vector data depending on feature information of a segment according to various embodiments of the present disclosure;

FIGS. 12A, 12B, and 12C are views illustrating a method of generating a page including the layout of a segment, the category of the segment, and feature information according to the category by using image data according to various embodiments of the present disclosure;

Throughout the drawings, it should be noted that like reference numbers are used to depict the same or similar elements, features, and structures.

DETAILED DESCRIPTION

Figure 1:
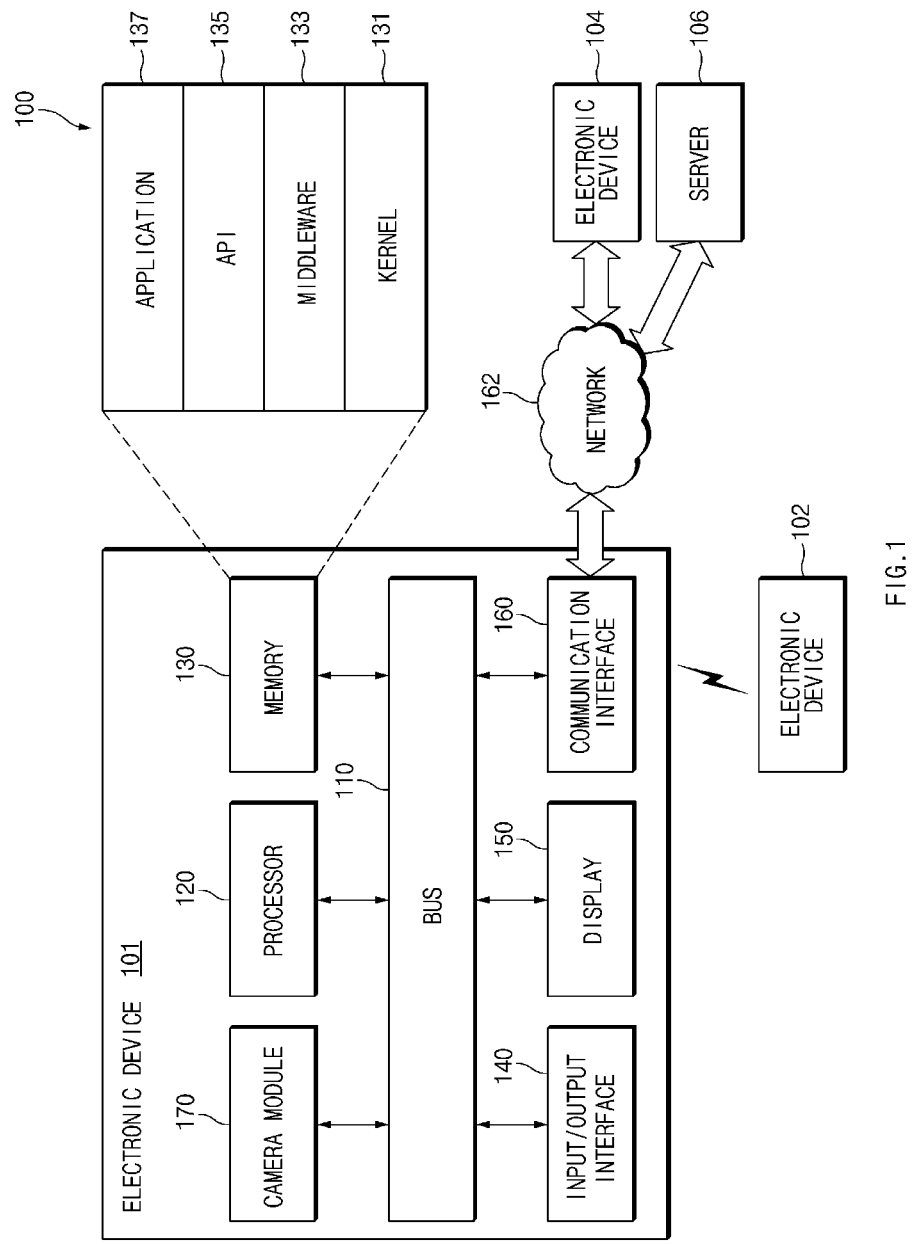
FIG. 1 is a block diagram of an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include," "comprise," and "have", or "may include," or "may comprise" and "may have" used herein indicates disclosed functions, operations, or existence of elements but does not exclude other functions, operations or elements.

For instance, the expression "A or B", or "at least one of A or/and B" may indicate include A, B, or both A and B. For instance, the expression "A or B", or "at least one of A or/and B" may indicate (1) at least one A, (2) at least one B, or (3) both at least one A and at least one B.

The terms such as "1st", "2nd", "first", "second", and the like used herein may refer to modifying various different elements of various embodiments of the present disclosure, but do not limit the elements. For instance, "a first user device" and "a second user device" may indicate different users regardless of the order or the importance. For example, a first component may be referred to as a second component and vice versa without departing from the scope of the present disclosure.

In various embodiments of the present disclosure, it will be understood that when a component (for example, a first component) is referred to as being "(operatively or communicatively) coupled with/to" or "connected to" another component (for example, a second component), the component can be directly connected to the other component or connected through another component (for example, a third component). In various embodiments of the present disclosure, it will be understood that when a component (for example, a first component) is referred to as being "directly connected to" or "directly access" another component (for example, a second component), another component (for example, a third component) does not exist between the component (for example, the first component) and the other component (for example, the second component).

The expression "configured to" used in various embodiments of the present disclosure may be interchangeably used with "suitable for", "having the capacity to", "designed to", "adapted to", "made to", or "capable of" according to a situation, for example. The term "configured to" may not necessarily mean "specifically designed to" in terms of hardware. Instead, the expression "a device configured to" in some situations may mean that the device and another device or part are "capable of". For example, "a processor configured (or set) to perform A, B, and C" in a phrase may mean a dedicated processor (for example, an embedded processor) for performing a corresponding operation or a generic-purpose processor (for example, a central processing unit (CPU) or application processor (AP)) for performing corresponding operations by executing at least one software program stored in a memory device.

Otherwise indicated herein, all the terms used herein, which include technical or scientific terms, may have the same meaning that is generally understood by a person skilled in the art. In general, the terms defined in the dictionary should be considered to have the same meaning as the contextual meaning of the related art, and, unless clearly defined herein, should not be understood abnormally or as having an excessively formal meaning. In any cases, even the terms defined in this specification cannot be interpreted as excluding embodiments of the present disclosure.

According to various embodiments of the present disclosure, electronic devices may include at least one of smartphones, tablet personal computers (PCs), mobile phones, video phones, electronic book (e-book) readers, desktop PCs, laptop PCs, netbook computers, workstation server, personal digital assistants (PDAs), portable multimedia player (PMPs), moving picture experts group (MPEG) audio layer 3 (MP3) players, mobile medical devices, cameras, and wearable devices (for example, smart glasses, head-mounted-devices (HMDs), electronic apparel, electronic bracelets, electronic necklaces, electronic appcessories, electronic tattoos, smart mirrors, and smart watches).

According to some embodiments of the present disclosure, an electronic device may be smart home appliances. The smart home appliances may include at least one of, for example, televisions, digital versatile disc (DVD) players, audios, refrigerators, air conditioners, cleaners, ovens, microwave ovens, washing machines, air cleaners, set-top boxes, home automation control panels, security control panels, television (TV) boxes (e.g., Samsung HomeSync™, Apple TV™ or Google TV™), game consoles (for example, Xbox™ and PlayStation™), electronic dictionaries, electronic keys, camcorders, and electronic picture frames.

According to some embodiments of the present disclosure, an electronic device may include at least one of various medical devices supporting call forwarding service (for example, various portable measurement devices (for example, glucometers, heart rate meters, blood pressure meters, temperature meters, etc.), magnetic resonance angiography (MRA) devices, magnetic resonance imaging (MRI) devices, computed tomography (CT) devices, medical imaging devices, ultrasonic devices, etc.), navigation devices, global positioning system (GPS) receivers, event data recorders (EDRs), flight data recorders (FDRs), vehicle infotainment devices, marine electronic equipment (for example, marine navigation systems, gyro compasses, etc.), avionics, security equipment, vehicle head units, industrial or household robots, financial institutions' automatic teller's machines (ATMs), or stores' point of sales (POS) or internet of things (for example, bulbs, various sensors, electric or gas meters, sprinkler systems, fire alarms, thermostats, street lights, toasters, exercise equipment, hot water tanks, heaters, boilers, etc.).

In various embodiments of the present disclosure, an electronic device may include at least one of part of furniture or buildings/structures supporting call forwarding service, electronic boards, electronic signature receiving devices, projectors, and various measuring instruments (for example, water, electricity, gas, or radio signal measuring instruments). An electronic device according to various embodiments of the present disclosure may be one of the above-mentioned various devices or a combination thereof. Additionally, an electronic device according to an embodiment of the present disclosure may be a flexible electronic device. Additionally, an electronic device according to an embodiment of the present disclosure is not limited to the above-mentioned devices and may include a new kind of an electronic device according to the technology development.

Hereinafter, an electronic device according to various embodiments of the present disclosure will be described in more detail with reference to the accompanying drawings. The term "user" in this disclosure may refer to a person using an electronic device or a device using an electronic device (for example, an artificial intelligent electronic device).

FIG. 1 is a block diagram of an electronic device according to various embodiments of the present disclosure.

Referring to FIG. 1, an electronic device 101 in a network environment 100 is described according to various embodiments of the present disclosure. The electronic device 101 may include a bus 110, a processor 120, a memory 130, an input/output interface 140, a display 150, and a communication interface 160. According to an embodiment of the present disclosure, the electronic device 101 may omit at least one of the components or may additionally include a different component.

The bus 110, for example, may include a circuit for connecting the components 110 to 170 to each other and delivering a communication (for example, control message and/or data) between the components 110 to 170.

The processor 120 may include at least one of a CPU, an AP, and a communication processor (CP). The processor 120, for example, may execute calculation or data processing for control and/or communication of at least one another component of the electronic device 101.

According to various embodiments of the present disclosure, the processor 120 may divide an image into at least one segment corresponding to the feature of at least part of image data.

According to various embodiments of the present disclosure, the processor 120 may determine a category of each segment corresponding to the feature of at least part of image data.

The processor 120 may determine a category of a segment based on at least one of a distribution pattern of a red, green, and blue (RGB) value and a distribution pattern of an edge in image data of a segment. Alternatively, the processor 120 may obtain a target area that extracts a pixel via at least one specific channel from an image obtained by the conversion of color coordinate system. The processor 120 may obtain at least one of a ratio (or percentage) that the target area occupies in an image area corresponding to the image data, the complexity of a vector obtained by the vector conversion of each pixel in the target area, and the dispersion of the target area in the image area.

For example, the processor 120 may determine a category of each segment as one of an image (corresponding to a raster image), a text, and a vector image corresponding to the feature of at least part of the image data. Additionally, the processor 120 may further determine feature information corresponding to a category with respect to each segment. For example, when the category is an image, the feature information may include resolution, brightness, luminosity, setting information at the time of capturing an image, face recognition information, image tagging information, texture that an image makes, and so on. According to various embodiments of the present disclosure, when the category is a vector image, the feature information may include the thickness of vector data that the image data has, a stroke pattern, a handwriting pen type depending on the pattern, a writing speed for expressing fine thickness information, a writing pressure, an end point form, a pen tilt, rotation information of a pen, Unicode text data through stroke recognition, and so on. According to various embodiments of the present disclosure, when the category is text, the feature information may include font style, size, thickness, italic or not, color, underline, highlight, character spacing, line spacing, and so on.

According to various embodiments of the present disclosure, the processor 120 may convert the form of image data in each segment based on the category of each segment. Alternatively, the processor 120 may convert the layout (for example, the size or arrangement of a segment) of the image data corresponding to the category of each segment.

According to various embodiments of the present disclosure, the processor 120 may create a page including the layout of a segment, the category of the segment, and feature information corresponding to the category. The processor 120 may apply the category of a segment, which is determined based on position information of a user input, and feature information corresponding to the category in the created page to the user input.

According to various embodiments of the present disclosure, the processor 120 may provide a guide generated based on an edge detected from preview image data to the preview image data. Alternatively, the processor 120 may control the sensibility of the guide in order not to provide a wrong guide. For example, if the generated guide is changed more than a specified critical value or a change of more than the specified value is not maintained for longer than a threshold time, the processor 120 may not reflect the generated guide to preview image data.

The memory 130 may include volatile and/or nonvolatile memory. The memory 130, for example, may store instructions or data relating to at least one another component of the electronic device 101. According to an embodiment of the present disclosure, the memory 130 may store software and/or programs. The programs may include a kernel 131, a middleware 133, an application programming interface (API) 135, and/or an application program (or an application) 137. At least part of the kernel 131, the middleware 133, or the API 135 may be called an operating system (OS).

According to various embodiments of the present disclosure, the memory 130 may store image data in the form converted by the processor 120. Additionally, the memory 130 may store a category of each segment and feature information corresponding to the category. For example, when the category is a text, the memory 130 may store text data obtained by converting the image data of a corresponding segment and the feature information (for example, at least one of the background, color, font, size, paragraph, underline, and table of a segment) of text data. For example, when the category is a vector image, the memory 130 may store vector data obtained by converting the image data of a corresponding segment and the feature information (for example, at least one of the thickness, start point and end point form, thickness change value, color change value, and material information of a stroke) of vector data.

According to various embodiments of the present disclosure, the memory 130 may store a page including the layout of a segment, the category of the segment, and feature information corresponding to the category.

According to various embodiments of the present disclosure, the memory 130 may store preview image data or image data, all of which are obtained through the camera module 170. The memory 130 may store edge data detected by the processor 120 and a guide generated based on the detected edge.

The kernel 131, for example, may control or manage system resources (for example, the bus 110, the processor 120, the memory 130, and so on) used for performing operations or functions implemented in other programs (for example, the middleware 133, the API 135, or the application program 137). Additionally, the kernel 131 may provide an interface for controlling or managing system resources by accessing an individual component of the electronic device 101 from the middleware 133, the API 135, or the application program 137.

The middleware 133, for example, may serve as an intermediary role for exchanging data as the API 135 or the application program 137 communicates with the kernel 131.

Additionally, the middleware 133 may process at least one job request received from the application program 137 corresponding to a priority. For example, the middleware 133 may assign to at least one application program 137 a priority for using a system resource (for example, the bus 110, the processor 120, or the memory 130) of the electronic device 101. For example, the middleware 133 may perform scheduling or load balancing on the at least one job request by processing the at least one job request corresponding to the priority assigned to the at least one job request.

The API 135, as an interface for allowing the application program 137 to control a function provided from the kernel 131 or the middleware 132, may include at least one interface or function (for example, an instruction) for file control, window control, image processing, or character control.

The input/output interface 140, for example, may serve as an interface for delivering instructions or data inputted from a user or another external device to another component(s) of the electronic device 101. Additionally, the input/output interface 140 may output instructions or data received from another component(s) of the electronic device 101 to a user or another external device.

The display 150, for example, may include a liquid crystal display (LCD), a light emitting diode (LED) display, an organic LED (OLED) display, a microelectromechanical systems (MEMS) display, or an electronic paper display. The display 150, for example, may display a variety of content (for example, text, image, video, icon, symbol, and so on) to a user. The display 150 may include a touch screen, and for example, may receive a touch, gesture, proximity, or hovering input by using an electronic pen or a user's body part.

According to various embodiments of the present disclosure, the display 150 may display the image data in a converted form through the processor 120.

According to various embodiments of the present disclosure, the display 150 may display preview image data or image data, all of which are obtained through the camera module 170.

According to various embodiments of the present disclosure, the display 150 may provide a guide generated based on an edge detected from preview image data in addition to the preview image data.

According to various embodiments of the present disclosure, the display 150 may display a page including the layout of a segment generated by the processor 120, the category of the segment, and feature information corresponding to the category. When a user input is received, the display 150 may display the user input by applying the category of the segment and the feature information corresponding to the category to the position of the segment determined based on the position information of the user input.

The communication interface 160, for example, may set a communication between the electronic device 101 and an external device (for example, the first external electronic device 102, the second external electronic device 104, or the server 106). For example, the communication interface 160 may communicate with an external device (for example, the second external electronic device 104 or the server 106) in connection to the network 162 through wireless communication or wired communication.

The wireless communication, such as a cellular communication protocol, may use at least one of long-term evolution (LTE), LTE-advanced (LTE-A), code division multiple access (CDMA), wideband CDMA (WCDMA), universal mobile telecommunications system (UMTS), wireless broadband (WiBro), global system for mobile communications (GSM), and so on. Additionally, the wireless communication, for example, may include a short range communication. The short range communication, for example, may include at least one of wireless fidelity (WiFi), bluetooth (BT), near field communication (NFC), GPS, and so on. The wired communication, for example, may include at least one of universal serial bus (USB), high definition multimedia interface (HDMI), recommended standard 232 (RS-232), plain old telephone service (POTS), and so on. The network 162 may include telecommunications network, for example, at least one of computer network (for example, local area network (LAN) or wide area network (WAN)), internet, and telephone network.

Each of the first and second external electronic devices 102 and 104 may be the same or different type of the electronic device 101. According to an embodiment of the present disclosure, the server 106 may include a group of one or more servers. According to various embodiments of the present disclosure, all or part of operations executed on the electronic device 101 may be executed on another one or more electronic devices (for example, the first or second external electronic devices 102 or 104 or the server 106).

According to an embodiment of the present disclosure, when the electronic device 101 performs a certain function or service automatically or by a request, it may request at least part of a function relating thereto from another device (for example, the first or second external electronic devices 102 or 104 or the server 106) instead of or in addition to executing the function or service by itself. The other electronic device (for example, the first or second external electronic devices 102 or 104 or the server 106) may execute a requested function or an additional function and may deliver an execution result to the electronic device 101. The electronic device 101 may provide the requested function or service as it is or by processing the received result additionally. For this, for example, cloud computing, distributed computing, or client-server computing technology may be used.

The camera module 170 may obtain preview image data and the image data by using an equipped image sensor.

Figure 2:
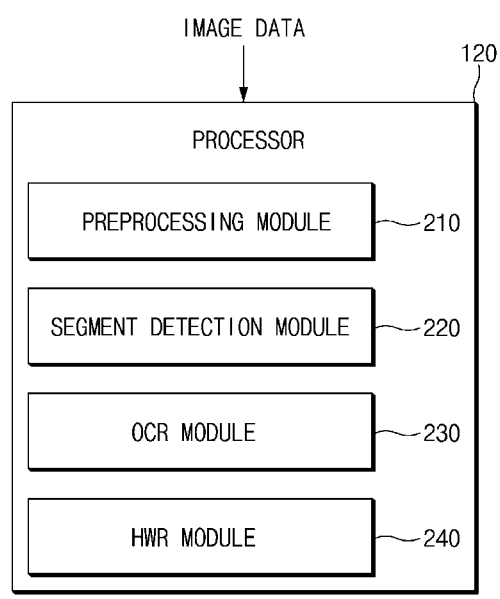
FIG. 2 is a block diagram of a processor in an electronic device according to various embodiments of the present disclosure.

FIG. 2 is a block diagram of a processor in an electronic device according to various embodiments of the present disclosure.

Referring to FIG. 2, a preprocessing module 210 may perform preprocessing on image data in order to improve a stroke recognition rate of image data or a recognition rate of a character. For example, the preprocessing module 210 may perform a setting value of an image sensor, guide provision, or equiponderation correction during image data acquisition in order to obtain a clearer text or image included in image data. A specific description relating thereto may refer to FIGS. 6A to 7C.

A segment detection module 220 may distinguish a detected edge from image data and may obtain a plurality of rectangles configuring image data corresponding to the rules of image data. The segment detection module 220 may integrate some of the plurality of rectangles based on the category of a segment. A specific description relating thereto may refer to FIGS. 10A to 10E.

According to various embodiments of the present disclosure, the segment detection module 220 may convert the color coordinate system of image data and may obtain a target area that extracts a pixel via at least one specific channel from an image obtained by the conversion of the color coordinate system. The segment detection module 220 may determine the category of the segment by using at least one of a percentage (for example, a ratio or a percentage that the number of pixels of a target area occupies with respect to the number of pixels in entire image data) that a target area occupies in an entire image area, the complexity of a vector obtained by the vector conversion of each pixel in the target area, and the dispersion of the target area in the image area. For example, the color coordinate system may be a hue, saturation, and value (HSV) color coordinate system.

For example, the segment detection module 220 may determine the category of a segment corresponding to whether the segment includes a character. The character (for example, a character included in a segment) may include at least one of a standardized character, a non-standardized character, and a handwritten character. A segment including a character may be classified as two categories of text and vector image corresponding to a recognition rate (for example, the accuracy of recognition) of an optical character recognition (OCR) module 230. A segment not including a character may be classified as a category of an image (for example, a raster image). For example, based on an analysis of image data of a segment, the segment detection module 220 may determine whether the segment includes a character by extracting character features such as the horizontal writing or vertical writing of a character and the configuration of a paragraph.

The OCR module 230 may perform the character recognition of image data in a segment. The OCR module 230 may calculate the accuracy of the image data in the segment through the character recognition and may determine whether the category of the image data in the segment is a text based on the accuracy. When the category is a text, the OCR module 230 may store Unicode text data converted from the image data of the segment through the character recognition. Additionally, the OCR module 230 may extract feature information that the Unicode text data has through an analysis of image data. According to various embodiments of the present disclosure, the feature information may be values representing various Unicode text data such as the font style, size, italic or not, color, underline, highlight, character spacing, and line spacing of text data that image data has.

A handwriting recognition (HWR) module 240 may obtain vector data converted from the image data of a segment of which category is not a text by a character recognition result of the OCR module 230. Additionally, the HWR module 240 may extract feature information that stroke data has through an analysis of image data. According to an embodiment of the present disclosure, the feature information may be values representing various stroke data such as the thickness of vector data that image data has, a stroke pattern, a handwriting pen type depending on the pattern, a writing speed for expressing fine thickness information, a writing pressure, a pen tilt, rotation information of a pen, Unicode text data through stroke recognition, and so on. Additionally, the HWR module 240 may generate arbitrary time information through a user's manual input or a user's handwriting pattern analysis, and may perform stroke recognition by using at least one of the generated time information and the extracted stroke data information. The recognized stroke information may be converted into vector data including figures and special characters. The HWR module 240 may store the category of the segment, feature information corresponding to the category, and converted vector data in the memory 130.

As mentioned above, an electronic device according to an embodiment of the present disclosure includes a memory for storing at least one instruction relating to segment separation and category determination and conversion corresponding to the segment and a processor for performing the at least one instruction in connection to the memory. An instruction performed by the processor may be set to perform at least one of dividing image data into at least one segment corresponding to at least part of features, determining a category corresponding to the segment, and converting the segment based on the category of the segment.

Figure 3:
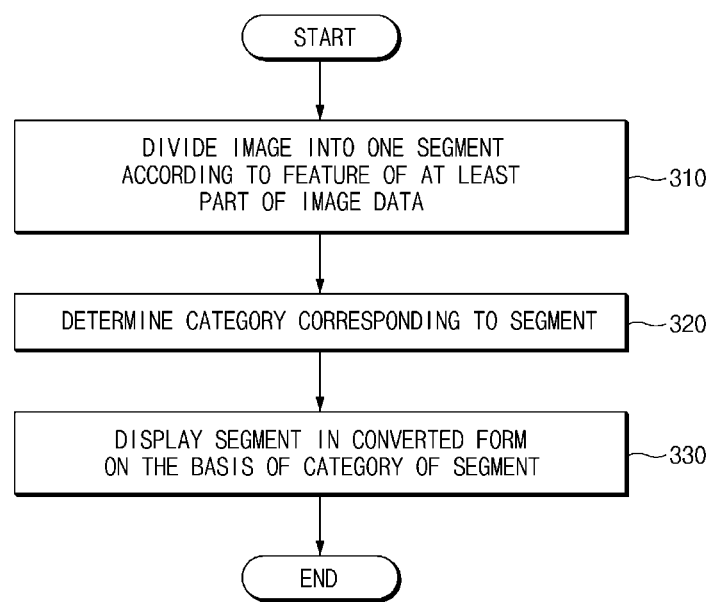
FIG. 3 is a flowchart illustrating a method of processing image data of an electronic device according to various embodiments of the present disclosure.

FIG. 3 is a flowchart illustrating a method of processing image data of an electronic device according to various embodiments of the present disclosure.

Referring to FIG. 3, a method shown in FIG. 3 for processing image data of the electronic device 101 may be configured with operations processed by the electronic device 101 shown in FIG. 1. Accordingly, although some content is omitted in this embodiment of the present disclosure, the above described content relating to the electronic device 101 of FIG. 1 is applied to the method shown in FIG. 3.

In operation 310, the processor 120 may divide image data into at least one segment.

In operation 320, the processor 120 may determine the category of a segment according the feature of image data in a segment. For example, the processor 120 may determine the category of the segment (for example, an image such as a raster image, a text, and a vector image) based on at least one of a distribution pattern of an RGB value and a distribution pattern of an edge in image data of a segment. Alternatively, the processor 120 may obtains a target area that extracts a pixel via at least one specific channel from image data obtained through color coordinate system, and may determine whether the image data of the segment includes a character based on a percentage (for example, a ratio or a percentage that the number of pixels of a target area occupies with respect to the number of pixels in entire image data) that the target area occupies in an image area, the complexity of a vector obtained by the vector conversion of each pixel in the target area, and the dispersion of the target area in the image area.

According to various embodiments of the present disclosure, the processor 120 may further determine feature information corresponding to a category. The processor 120 may change the determined feature information corresponding to an event such as a user input. For example, the processor 120 may convert the image data into a reconfigured form corresponding to feature information changed based on the event of the user input.

In operation 330, the display 150 may display image data in a converted form based on the category of a segment.

According to various embodiments of the present disclosure, the memory 130 may store the category of a segment in the image data, feature information corresponding to the category, or data in a converted form. Accordingly, a user may convert the category of a segment, feature information corresponding to the category, or data in a converted form into a form of tag information and by using this, may search for documents or images or manage documents or images.

According to various embodiments of the present disclosure, the processor 120 may edit image data while maintaining the category of a segment and feature information corresponding to the category. For example, the processor 120 may fetch image data that satisfies a segment category that a user wants and feature information corresponding to the category from the memory 130 and may create new content of a document while maintaining the segment category and the feature information or layout corresponding to the category.

Figure 4:
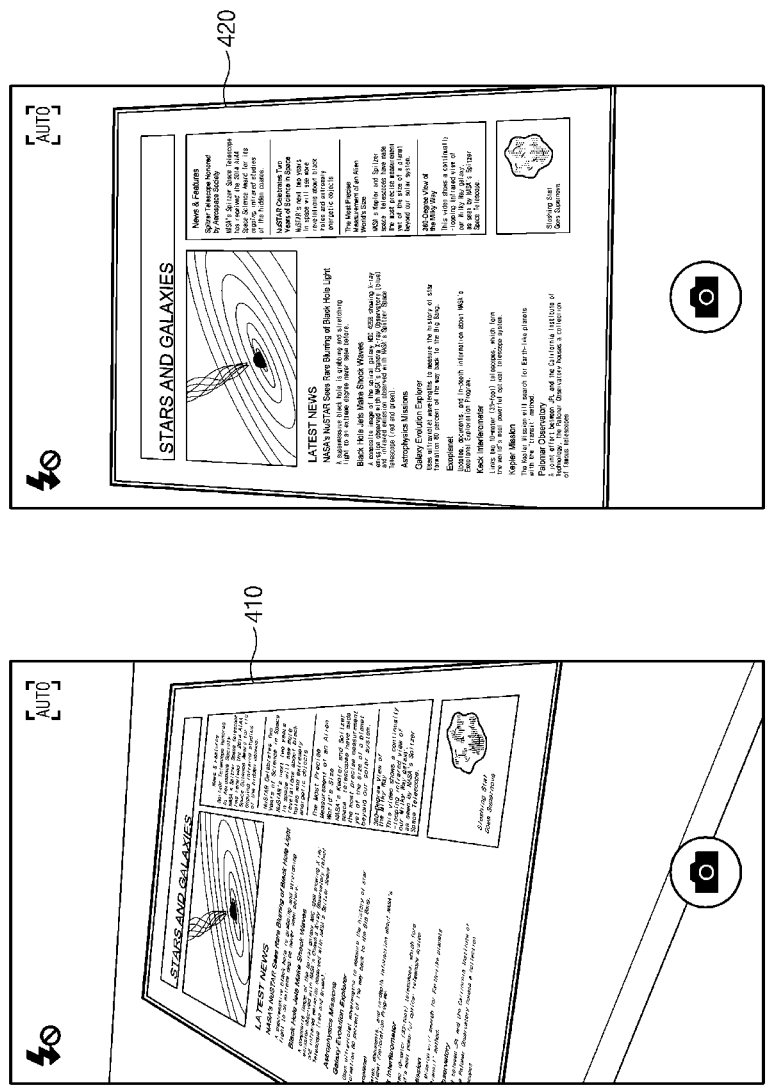
FIG. 4 is a view illustrating a screen for providing a guide according to various embodiments of the present disclosure.

FIG. 4 is a view illustrating a screen for providing a guide according to various embodiments of the present disclosure.

Referring to FIG. 4, in order to obtain accurate image data, the processor 120 may provide guides 410 and 420 to obtain image data further appropriate for image recognition during image data acquisition.

The processor 120 may detect an edge from preview image data obtained through the camera module 170. According to an embodiment of the present disclosure, the processor 120 may detect an edge by using a contrast difference between pixels in preview image data. For example, the processor 120 may detect, as an edge, pixels in which a difference of a pixel value with respect to an adjacent pixel (for example, a contrast difference with respect to an adjacent pixel based on a pixel value) is greater than a critical value. The processor 120 may adjust the critical value corresponding to a pixel value during the edge detection or the number of detected edges. The processor 120 may detect an edge by each area by dividing preview image data into a plurality of areas and applying different critical values.

The processor 120 may generate the guides 410 and 420 based on the detected edge and may provide the generated guides 410 and 420 on a displayed preview image.

For example, the processor 120 may connect the detected edges in order to obtain the outline of an object. When a rectangular outline is obtained, the processor 120 may provide a rectangular guide including an optimal area that a user intends by using an angle between lines configuring the rectangle, whether the lines are connected, a height, or a width. During this operation, the processor 120 may provide a guide that is similar to a rectangle form as much as possible.

According to an embodiment of the present disclosure, the processor 120 may provide a guide for preventing a perspective distortion phenomenon for an area that a user wants in order to easily analyze image data detected from preview image data. The processor 120 may measure an angle of each rectangular edge or may measure a different length of each facing side. When the measurement value is greater than the critical value, the processor may display a guide in which color information of lines forming a rectangular guide, color information inside the rectangle, the form of lines forming the rectangle, an icon, or a transparency is changed, so that as a user recognizes this, a guide may be made to measure image data that is recognized further easily.

When a guide is provided, the processor 120 may prevent a guide from being generated based on invalid data. For example, invalid image data may be obtained temporarily due to a user's hand tremor or focus shaking. At this point, the processor 120 may not reflect a guide generated based on invalid data to preview image data through an analysis of edge data such as comparing a detected edge with a previously detected edge.

According to an embodiment of the present disclosure, if a guide is changed more than a specified critical value and a change of more than the specified critical value is not maintained for longer than a threshold time, the processor 120 may not reflect the generated guide to the preview image data.

According to an embodiment of the present disclosure, when generating a guide based on an edge detected from preview image data, the processor 120 may specify a reception interval for receiving the preview image data and may not use preview image data received between specified intervals, in order to generate an accurate guide.

According to an embodiment of the present disclosure, the processor 120 may display a guide rectangle through a connection between the edges on a preview image and may notify a guide for obtaining an accurate image to a user through a visual effect (for example, a color change, a transparency change in the icon or the rectangle, or blur effect) of the guide rectangle.

According to an embodiment of the present disclosure, if an edge is not detected from preview image data, the processor 120 may display a previously generated guide and may retry the edge detection of preview image data after a specified threshold time.

According to an embodiment of the present disclosure, the memory 130 may store edge data detected from the obtained preview image data. If an edge detected from the obtained image data does not correspond to an edge detected from preview image data before image capturing, the processor 120 may use the edge detected from the preview image data instead of the edge detected from the obtained image data.

For example, the processor 120 may obtain the outline of an object by connecting the detected edges. When a rectangular outline is obtained, the processor 120 may configure a guide rectangle by using an angle between lines configuring the rectangle, whether the lines are connected, a height, a width, and so on. Accordingly, the processor 120 may extract an area that a user wants. Based on this, the processor 120 may support a user to obtain image data that is similar to a rectangle form as much as possible.

Figure 5:
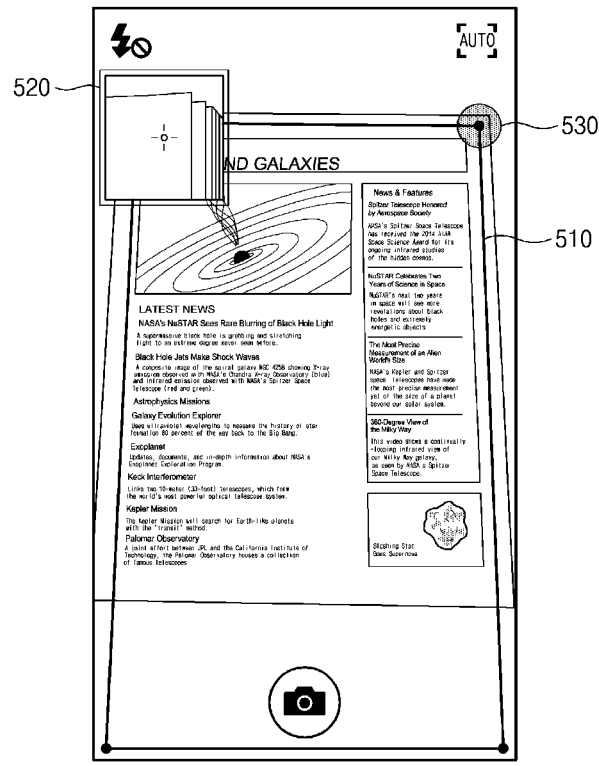
FIG. 5 is a view illustrating a screen for providing a user interface through which a user adjusts a guide according to various embodiments of the present disclosure.

FIG. 5 is a view illustrating a screen for providing a user interface through which a user adjusts a guide according to various embodiments of the present disclosure.

The processor 120 may provide a user interface through which a user adjusts a guide 510 manually. The processor 120 may receive an input event through the input/output interface 140 and may display the guide 510 in a form adjusted in correspondence to the input event.

According to an embodiment of the present disclosure, the processor 120 may enlarge 520 part of preview image data and output it corresponding to an input event adjusting the guide 510. Accordingly, a user may precisely adjust the guide 510 based on the enlarged preview image data.

According to an embodiment of the present disclosure, the processor 120 may adjust the movement magnification of a touch input corresponding to conditions such as the moving speed of a touch input and the pressure of a touch input. Accordingly, a user may more precisely adjust the guide. For example, the display 150 may output a guide including a handler 530 for adjusting the position of the guide.

According to an embodiment of the present disclosure, as the position of a guide moves by an input event, the processor 120 may check whether there is an edge detected within a critical range of the moving position. If there is an edge, the processor 120 may set a guide to be automatically positioned at an edge closest to the moving position.

FIGS. 6A to 6D are views illustrating a method of converting a viewpoint of image data according to various embodiments of the present disclosure.

According to various embodiments of the present disclosure, the processor 120 may convert the viewpoint of the image data by using information obtained through a sensor module such as a laser sensor or a gyro sensor. For example, the processor 120 may calculate an angle between the electronic device 101 and an object by using a vertical/horizontal angle of the electronic device 101 and a distance from the electronic device 101 to the object. The processor 120 may equilibrate a viewpoint of image data by using the calculated angle.

The processor 120 may obtain a plurality of image data by varying a setting value such as the number of captured image data, an exposure value, or a white balance. The processor 120 may equilibrate the viewpoint of the image data by using the plurality of obtained image data.

Figure 6A:
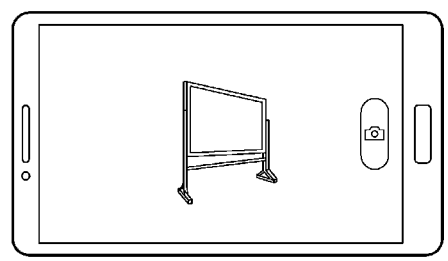
FIGS. 6A, 6B, 6C, and 6D are views illustrating a method of converting a viewpoint of image data according to various embodiments of the present disclosure.

For example, the processor 120, referring to FIGS. 6A to 6D, may detect an object area 610 and may enlarge the object area 610 to correspond to a screen manually or automatically (see FIG. 6A). For example, when a rectangular outline having a longer side is obtained from an object area, the length of a longer side may be enlarged by the length of the screen of the display 150.

Figure 6B:
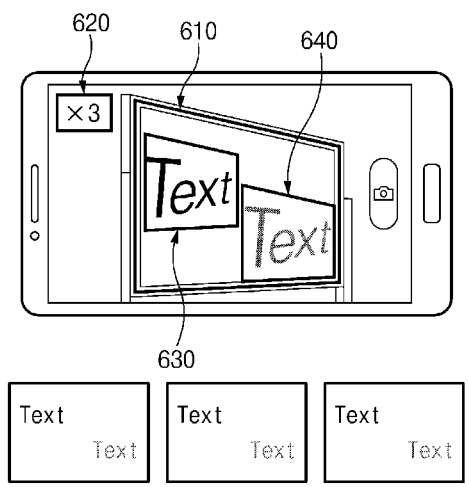
Figure 6C:
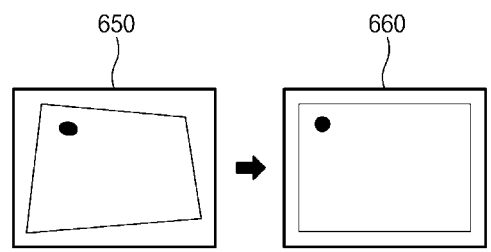
Figure 6D:
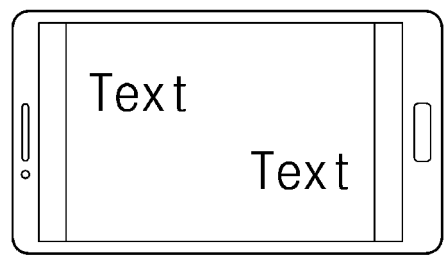

The processor 120 may obtain a zoom magnification 620 or contrast of an object area and based on this, may determine a shooting exposure time and the number of shootings (see FIG. 6B). For example, the processor 120 may increase the number of shootings according to a setting value (for example, if an exposure value drops less than a critical value). After image data is obtained through an image sensor, the processor 120 may correct the viewpoint of the image data 650 (see FIG. 6C). Accordingly, the processor 120 may obtain image data 660 of which resolution and viewpoint are corrected uniformly (see FIG. 6D).

According to various embodiments of the present disclosure, in order to obtain clear image data, the processor 120 may mutually complement blurred areas that each of image data 630 and 640 has and may perform an operation of synthesizing the at least one image data.

According to various embodiments of the present disclosure, the display 150 may represent the progress of a job by displaying a process of equilibrating the viewpoint of the image data in animation. For example, the processor 120 may divide an animation to be displayed on the display 150 by N operations, check the actual progress of a job being executed by the processor 120 at an interval of a unit time, and display an operation of an animation corresponding to the progress of the current job.

For example, if the progress of a job in execution is slower or identical to the operation of the animation, the operation of the animation displayed on the display 150 may be maintained as it is.

If the progress of a job being actually and currently executed by the processor 120 is faster than the operation of the animation, the processor 120 may adjust the progressing speed of the operation of the animation corresponding to a difference between the progress of the job in execution and the progress of the animation. For example, if the progress of the job being executed by the processor 120 is actually different by more than 30% from the progress of the animation, the processor 120 may process the progress of the operation of the animation (for example, in a form of reducing an interval of a processing time in the next operation). Alternatively, if the progress of the job being executed by the processor 120 is actually different by more than 10% and less than 30% from the progress of the animation, the processor 120 may process the progress of the operation of the animation a little slowly (for example, in a form of providing a delay to an interval of a processing time in the next operation). Alternatively, if the progress of the job being executed by the processor 120 is actually different by less than 10% from the progress of the animation, the processor 120 may process the progress of the operation of the animation very slowly (for example, in a form of providing a large value of delay to a time interval between operations.

Figure 7A:
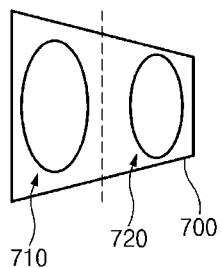
FIGS. 7A, 7B, and 7C are views illustrating a method of determining the number of images synthesized for correcting a distortion that occurs depending on a distance during a viewpoint conversion of image data according to various embodiments of the present disclosure.
Figure 7B:
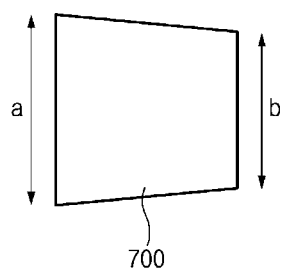
Figure 7C:
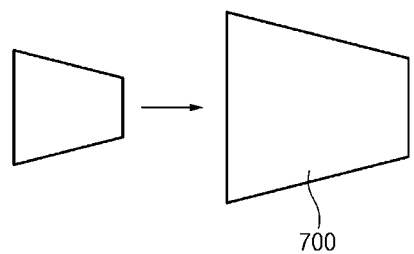

FIGS. 7A to 7C are views illustrating a method of determining the number of images synthesized for correcting a distortion that occurs depending on a perspective during a viewpoint conversion of image data according to various embodiments of the present disclosure.

In order to remove the distortion according to a perspective occurring during a viewpoint conversion of image data, the processor 120 may increase the clarity of image data through a synthesis of a plurality of images. The processor 120 may check a distortion area (for example, a blurred area enlarged through perspective correction) where a distortion occurs through correction during perspective correction corresponding to a viewpoint of image data, and may determine the number of images to be synthesized corresponding to the distortion area. In synthesizing a plurality of obtained images, the processor 120 may obtain one clear image by synthesizing the image data values of a distorted area (for example, a blurred area) in the plurality of images. The processor 120 may determine the number of shootings of image data by using at least one of the following methods.

Referring to FIG. 7A, the processor 120 may divide an object area 700 into a plurality of areas 710 and 720 corresponding to the form of an outline representing the object area 700. The processor 120 may determine the number of shootings based on a contrast difference or ratio (a:b) of a plurality of areas. For example, if the contrast ratio (a:b) of the plurality of areas 710 and 720 is greater than a critical value, the processor 120 may increase the number of shootings.

Referring to FIG. 7B, the processor 120 may determine the number of shootings based on a length difference or ratio (a:b) of both sides of a rectangle representing the object area 700. For example, the processor 120 may determine, as the number of shootings, the length ratio (a:b) of the left and right sides of the rectangle configuring the object area 700.

Referring to FIG. 7C, the processor 120 may determine the number of shootings based on a zoom magnification. For example, the processor 120 may increase the number of shootings as a zoom magnification increases.

After image data is obtained through an image sensor, the processor 120 may correct the image data. According to various embodiments of the present disclosure, in order to extract a clear image of image data, the processor 120 may mutually complement blurred areas that each image data has and may perform an operation of synthesizing the at least one image data.

FIG. 8 is a view illustrating a method of determining stroke information of vector data depending on feature information of a segment according to various embodiments of the present disclosure.

The processor 120 may convert the image data of the segment into vector data corresponding to the category of a segment. For example, if the category of a segment is a vector image, the processor 120 may convert the image data of the segment into vector data.

The processor 120 may obtain at least one feature information of the thickness of a line in the segment, the form of the start points and end points of the line, a thickness change value, a color change value, and material information corresponding to an analysis of the image data of the segment. A stroke may include information of converted vector data and the at least one feature information. Referring to FIG. 8, the stroke of a handwriting form shown in FIG. 8 may include feature information such as a thickness that becomes thinner as it goes toward the end point of a line, a small thickness change value, or no change in the color of a line.

The processor 120 may determine at least one stroke information of the type of a pen, a color, a thickness, a writing pressure, a writing speed, a tilt, and a rotation of the pen based on the obtained feature information. In the embodiment of FIG. 8, the processor 120 may determine the type of the pen as a sign pen based on the obtained feature information.

The processor 120 may reconfigure the image data of the segment by applying the stroke information to the vector data. In the embodiment of FIG. 8, when displaying vector data obtained by the HWR module 240 on the display 150, the processor 120 may select a pen type, for example, a sign pen.

According to various embodiments of the present disclosure, depending on the set pen type, the processor 120 may express stroke data differently by using feature information such as writing pressure, writing speed, the tilt of a pen, and the rotation of a pen, each of which relates to the drawing.

As one embodiment of the present disclosure, image data including a stroke drawn in a pen type having a thickness value that is changed corresponding to horizontal and vertical directions may be analyzed as a stroke having a plurality of thickness values corresponding to directions.

However, when a stroke of a pen type with a drawing of a different thickness corresponding to a direction is configured, image data shown may be converted into one stroke. For example, continuous two strokes having the same feature information may be integrated into one. Accordingly, the number of strokes may be reduced.

Figure 9:
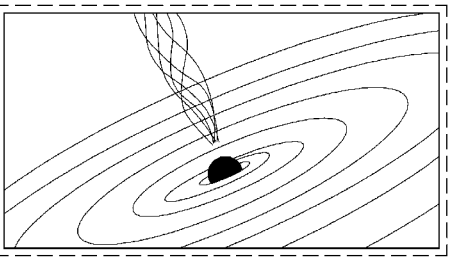
FIG. 9 is a view illustrating a method of determining the category of a segment depending on the feature of the image data of a segment according to various embodiments of the present disclosure.

FIG. 9 is a view illustrating a method of determining the category of a segment depending on the feature of the image data of a segment according to various embodiments of the present disclosure.

Image data divided into a plurality of segments 910, 920, 930, 940, and 950 is shown in FIG. 9. As described above, the processor 120 determines the category of each segment. For example, the processor 120 may further include, in a category, at least one feature information of the background, color, font, size, paragraph, underline, and table of the segment corresponding to an analysis of the image data of the segment.

Data in a stroke form overlaps on the text of image data as shown in FIG. 9. Marks 961, 962, 963, 964, and 965 additionally displayed on a text may have the meaning of an important display or an underline and thus, when the image data is reconfigured, the mark portions are required to be reflected to converted text data.

The processor 120 may obtain a marked area from the image data of the segment and may extract a color value of the marked area. The extracted color value may represent the color value of a mark. The marked area may be an area including the marks 961, 962, 963, 964, and 965 overlappingly displayed on a text or may be a meaningful data area obtained corresponding to an analysis result of image data. As one embodiment of the present disclosure, the meaningful data area may be image data excluding a character area or background included in the image data of a segment.

The processor 120 may perform image binarization on the image data of the marked area. The processor 120 may obtain data in the mark removed form by binarizing the marked area. For example, referring to FIG. 9, the binarized data may represent the text data of the marked area.

The processor 120 may convert the binarized data into a data type (for example, Unicode text data and vector data) corresponding to the category (for example, image, text, and vector image) of the segment. By applying the extracted color value to the converted data, the mark may be reflected to the converted data. Accordingly, the processor 120 may reconfigure the image data by reflecting the marks 961, 962, 963, 964, and 965 that a user additionally displays to the converted data.

FIGS. 10A to 10E are views illustrating a method of grouping a plurality of segments separated from image data corresponding to the category of a segment according to various embodiments of the present disclosure.

Figure 10A:
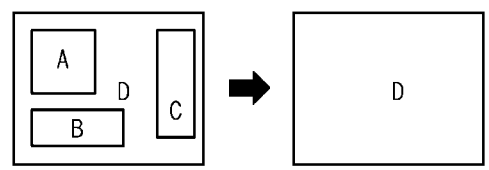
FIGS. 10A, 10B, 10C, 10D, and 10E are views illustrating a method of grouping a plurality of segments separated from image data according to the category of a segment according to various embodiments of the present disclosure.

Referring to FIG. 10A, if other rectangles are included in a recognized rectangle and have the same category (for example, image, text, and vector image), the processor 120 may integrate the rectangles into one rectangle.

Figure 10B:
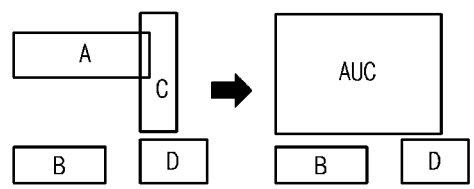

Referring to FIG. 10B, if there are overlapping areas between recognized rectangles and the rectangles have the same category, the processor 120 may integrate the rectangles into one rectangle.

Figure 10C:
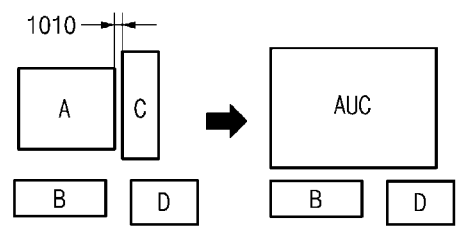

Referring to FIG. 10C, if a distance 1010 between adjacent rectangle is less than a reference value and the rectangles have the same category, the processor 120 may integrate the rectangles into one rectangle.

Figure 10D:
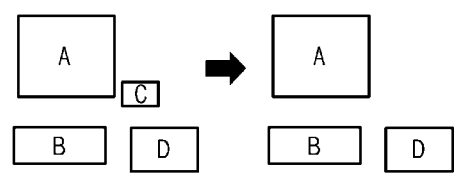

Referring to FIG. 10D, if the size of a recognized rectangle is less than a reference value, the processor 120 may regard corresponding rectangles as meaningless and may delete them.

Figure 10E:
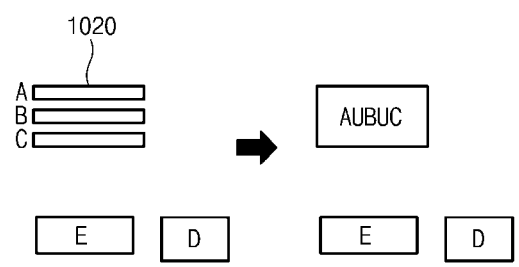

Referring to FIG. 10E, if a plurality of horizontal lines 1020 are included inside a recognized rectangle, the processor 120 may determine them as a chart or a table and may integrate them into one rectangle.

The processor 120 may separate segments from image data through at least one of the above-mentioned operations.

FIGS. 11A to 11E are views illustrating a method of changing the layout of image data based on a segment separated from image data according to various embodiments of the present disclosure.

Figure 11A:
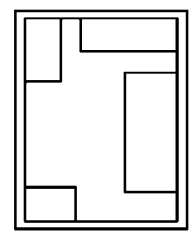
FIGS. 11A, 11B, 11C, 11D, and 11E are views illustrating a method of changing the layout of image data based on a segment separated from image data according to various embodiments of the present disclosure.

According to various embodiments of the present disclosure, referring to FIG. 11A, the processor 120 may extract the layout of the image data corresponding to the arrangement of a segment.

Figure 11B:
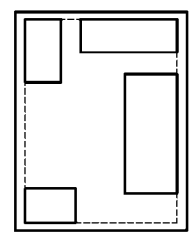

According to various embodiments of the present disclosure, referring to FIG. 11B, the processor 120 may obtain layout information including at least one of the relative position of the segment in the image data, the size ratio of the segment, and the alignment form of the segment corresponding to an analysis of the layout of the image data.

Figure 11C:
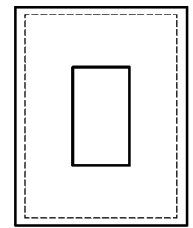

According to various embodiments of the present disclosure, referring to FIG. 11C, the processor 120 may provide a user interface for selecting a segment included in the page. The processor 120 may perform a change for a form of including only some of segments included in the page corresponding to a segment selection.

Figure 11D:
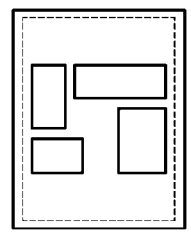

According to various embodiments of the present disclosure, referring to FIG. 11D, the processor 120 may change an alignment form such as left alignment, right alignment, or center alignment corresponding to the size of a page including entire image data and the size of each segment.

Figure 11E:
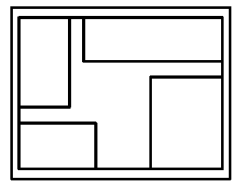

According to various embodiments of the present disclosure, referring to FIG. 11E, corresponding to the horizontal and vertical lengths of a page including entire image data, the processor 120 may change the form of an entire image in landscape mode or portrait mode.

According to various embodiments of the present disclosure, when an input event for changing the layout information is received, the processor 120 may change the layout of the image data based on the input event.

Referring to FIGS. 11A to 11E, the processor 120 may change the layout of image data in various forms based on a segment.

Figure 12B:
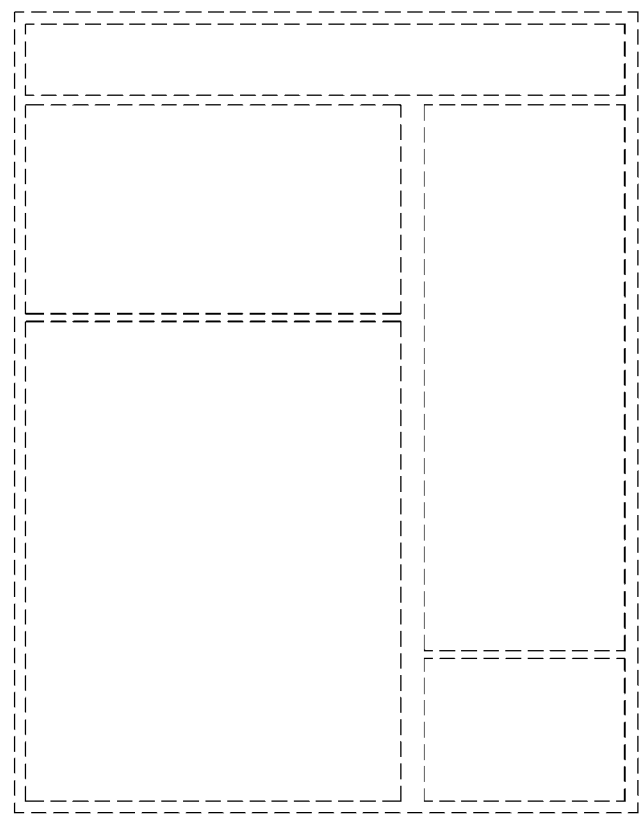
Figure 12C:
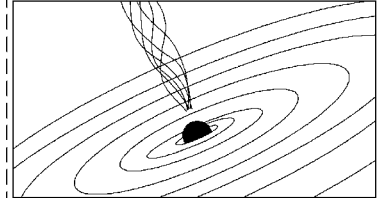

FIGS. 12A to 12C are views illustrating a method of creating a page including the layout of a segment, the category of the segment, and feature information corresponding to the category by using image data according to various embodiments of the present disclosure.

Referring to FIG. 12A, the processor 120 may divide image data into at least one segment. The processor 120 may determine the category of the segment and category based feature information corresponding to the feature of the image data of the segment.

Referring to FIG. 12B, the processor 120 may create a page including the layout of a segment, the category of the segment, and feature information corresponding to the category based on the segment.

When an input event corresponding to a user input is received, the processor 120 may determine a segment where the user input is to be displayed in the page based on the position information of the user input.

Referring to FIG. 12C, the display 150 may display the user input at the position of the segment by applying the category of the segment and the feature information corresponding to the category.

Figure 13:
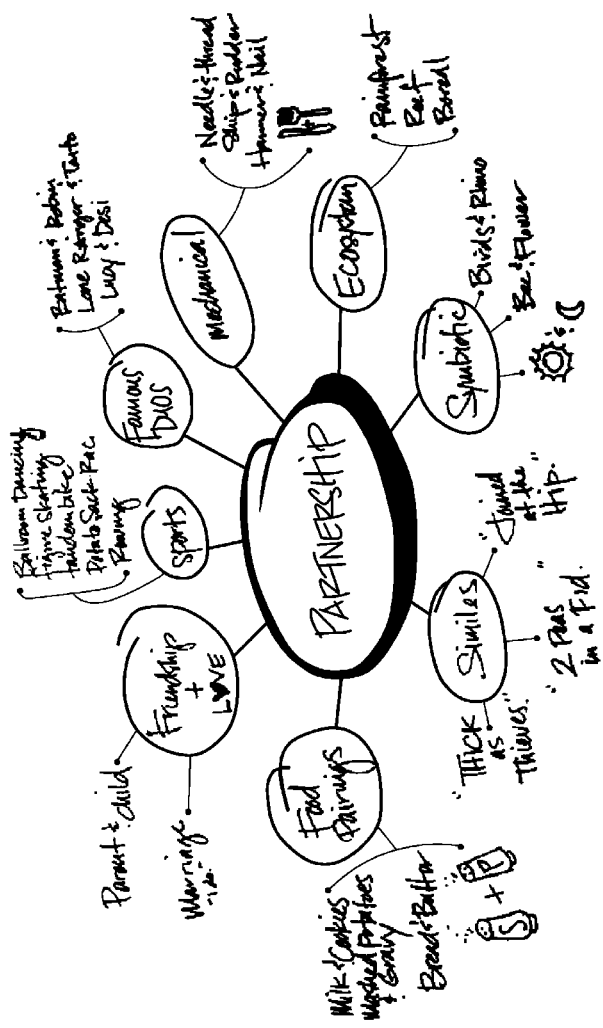
FIG. 13 is a view illustrating a method of applying a user input received from a plurality of electronic devices to a page including the layout of a segment, the category of the segment, and category based feature information according to various embodiments of the present disclosure.

FIG. 13 is a view illustrating a method of applying a user input received from a plurality of electronic devices to a page including the position information of a segment, the category of the segment, and category based feature information according to various embodiments of the present disclosure.

The communication interface 160 may receive a user input and the position information of the user input from at least one external electronic device functionally connected to the electronic device 101 Based on the user input and the position information of the user input received from the external electronic device, the processor 120 may determine a segment where the user input is to be displayed in the page. The display 150 may display the user input by applying the category of the segment and the feature information corresponding to the category to the position of the determined segment.

The processor 120 may display data that a user of each of a plurality of electronic devices inputs by applying the category of the segment and feature information corresponding to the category to one page.

According to various embodiments of the present disclosure, the processor 120 may support a group play through cameras of a plurality of electronic devices based on a network interoperation. For example, the processor 120 may capture an entire image to be made through a camera and divide the image into at least one segment corresponding to the feature of at least part of the captured image data. The processor 120 may determine a category corresponding to the divided segment. Herein, the processor 120 may determine a segment corresponding to the entire image corresponding to the feature of at least part of the captured image data. Additionally, the processor 120 may select at least one segment included in the entire image by using user selection, a relative position of a device, and so on. The processor 120 may deliver the position information of a segment, the category of the segment, and feature information corresponding to the category to the plurality of electronic device via network. The processor 120 may determine a delivered segment as a page. The processor 120 may collect each user input made to the page from a plurality of electronic devices and may configure an entire image as one page by combining each user input made to a corresponding position through the entire image. The processor 120 may determine the position information by using a low resolution image in a preview state and may make use of the category of each segment area and feature information corresponding to the category.

According to various embodiments of the present disclosure, the processor 120 may recognize the same segment through multi shooting in a plurality of electronic devices and may apply a dynamic presentation effect by using the plurality of received images. The processor 120 may classify each of a plurality of images as a segment. The processor 120 may process the segment of the same category as an object and may display the object continuously by using a user's input or time information (for example, information on a time at which an image is captured) that image data has. For example, the processor 120 may vary a font size in the segment of the same category of each of two images and may store it as the same segment after a predetermined time. When a time order display function execution is requested in a display screen, the processor 120 may perform a control to allow a character in the each segment to be displayed with a predetermined time interval.

As using the shown drawing as an example, a first electronic device performs a handwriting job relating to "Partners tip" written at the center part and a second electronic device may perform a handwriting job relating to "sports", for example. Additionally, other electronic devices may respectively perform a handwriting job relating to "food pairings" and a handwriting job relating to "ecosystem". Data relating to a handwriting job that each electronic device works may be delivered to a given specific electronic device and integrated as shown in the drawing. According to various embodiments of the present disclosure, after performing a handwriting job relating to subjects (for example, partners tip, food pairings, ecosystem, sports, and so on) shown in the drawing, a specific electronic device may perform a segment division. A user of a specific electronic device may respectively distribute the divided segments to other electronic devices connected via network. Each electronic device may perform an additional handwriting job on the received segment and deliver it to a specific electronic device. A specific electronic device may perform segment analysis processing of integrated image data by collecting segments that handwriting works. As mentioned above, an image data processing system according to the present disclosure may support the writing and editing functions of handwriting data as a plurality of electronic device cooperate.

Figure 14:
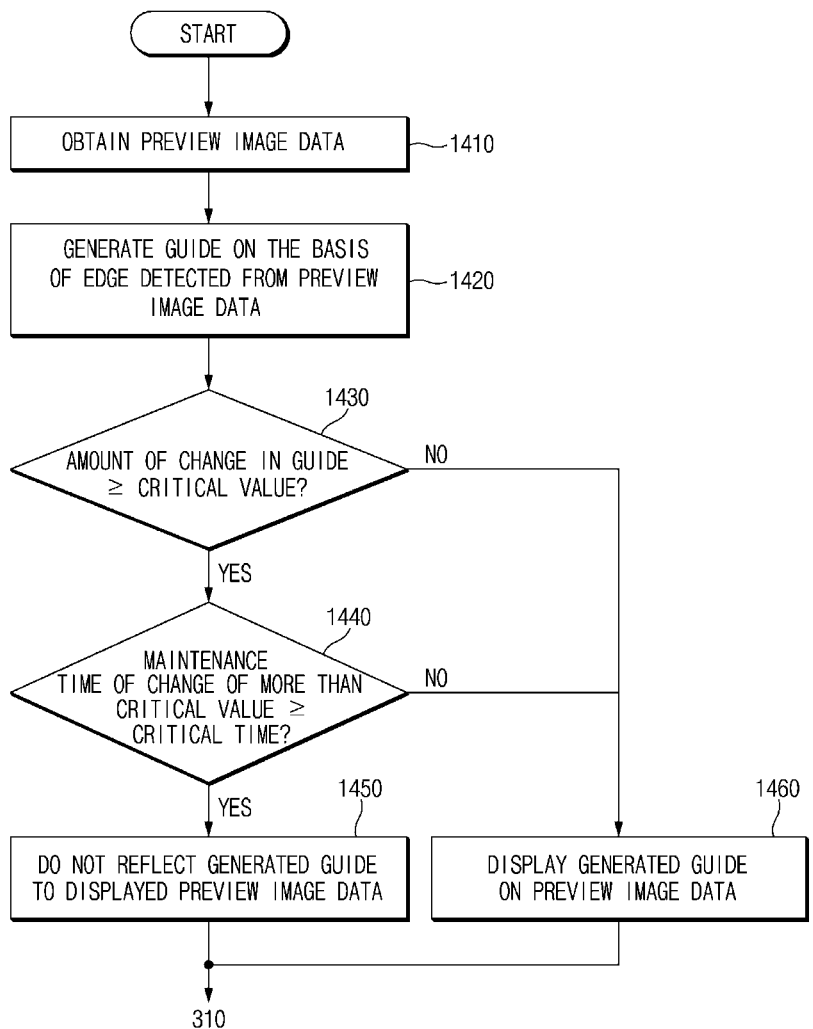
FIG. 14 is a flowchart illustrating a method of providing a guide to preview image data according to various embodiments of the present disclosure.

FIG. 14 is a flowchart illustrating a method of providing a guide to preview image data according to various embodiments of the present disclosure.

Referring to FIG. 14, the method of providing a guide to preview image data shown in FIG. 14 may be performed before operation 310 of FIG. 3. The method shown in FIG. 14 may be operations processed in the electronic device 101 of FIG. 1. Accordingly, although some content is omitted in this embodiment of the present disclosure, the above described content relating to the electronic device 101 of FIG. 1 is applied to the method shown in FIG. 14.

In operation 1410, the camera module 170 may obtain preview image data.

According to various embodiments of the present disclosure, the processor 120 may change a setting value of an image sensor for obtaining image data through an analysis of the preview image data. The setting value may include a focus value, an exposure value, a white balance, or a sharpness value. For example, when it is determined that a shooting place is a room through an analysis of preview image data, the processor 120 may change a setting value such as an exposure value or a sharpness value into a setting value more appropriate for indoor shooting.

In operation 1420, the processor 120 may generate a guide based on an edge detected from preview image data.

In operation 1430, the processor 120 may determine whether the amount of change (for example, |area of displayed guide−area of generated guide|) in at least one of the widths, positions, and guide rectangles' edge angles of the displayed guide and the generated guide is greater than a critical value. When the amount of change of the generated guide is greater than the critical value, the processor 120 may perform operation 1440. When the amount of change of the generated guide is less than the critical value, the processor 120 may perform operation 1460.

In operation 1440, the processor 120 may determine whether a change of more than the critical value is maintained less than a threshold time. When the change of more than the critical value is maintained shorter than the threshold time, the processor 120 may perform operation 1450. When the change of more than the critical value is maintained longer than the threshold time, the processor 120 may perform operation 1460.

In operation 1450, the processor 120 may not reflect the generated guide to the displayed preview image data.

In operation 1460, the display 150 may display the generated guide on the preview image data.

Figure 15:
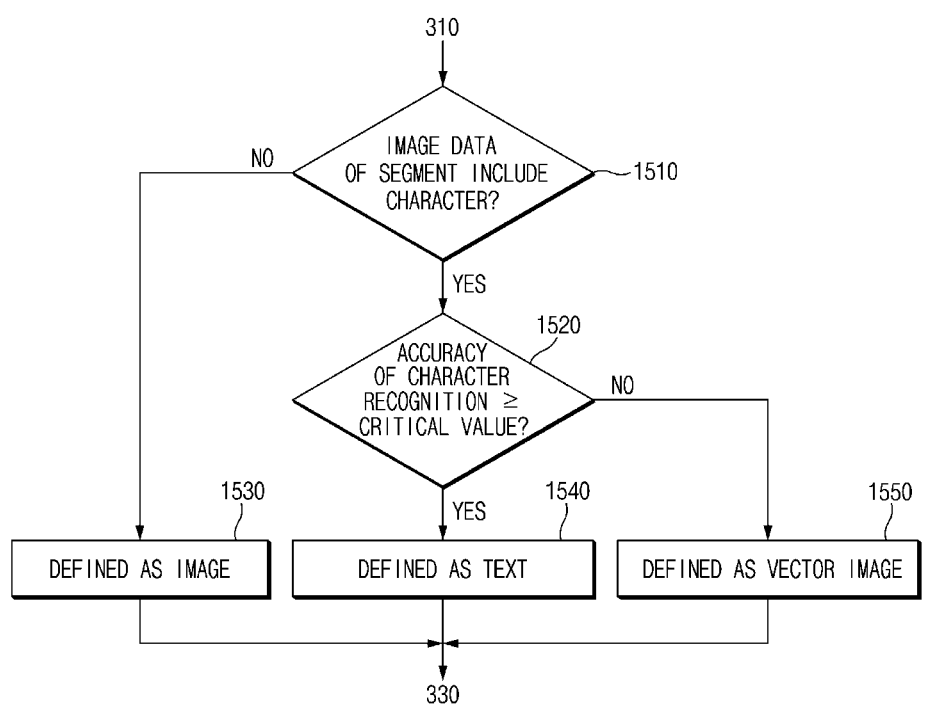
FIG. 15 is a flowchart illustrating a method of determining the category of a segment according to various embodiments of the present disclosure.

FIG. 15 is a flowchart illustrating a method of determining the category of a segment according to various embodiments of the present disclosure.

Referring to FIG. 15, the method of determining the category of a segment shown in FIG. 15 may be included in operation 320 of FIG. 3. The method shown in FIG. 15 is configured with operations processed in the electronic device 101 of FIG. 1. Accordingly, although some content is omitted in this embodiment of the present disclosure, the above described content relating to the electronic device 101 of FIG. 1 is applied to the method shown in FIG. 15.

In operation 1510, the processor 120 may determine whether image data of a segment includes a character. The character may include at least one of a standardized character, a non-standardized character, and a handwritten character.

For example, the processor 120 may determine whether image data of a segment includes a character based on at least one of a distribution pattern of an RGB value and a distribution pattern of an edge. Alternatively, the processor 120 may obtain a target area that extracts a pixel via at least one specific channel from an image area corresponding to image data obtained through the conversion of color coordinate system. The segment detection module 220 may determine whether image data of a segment includes a character in the target area based on a percentage (for example, a ratio or a percentage that the number of pixels of the target area occupies with respect to the number of pixels in entire image data) that the target area occupies in an entire image area, the complexity of a vector obtained by the vector conversion of each pixel in the target area, and the dispersion of the target area in the image area. For example, the color coordinate system may be a HSV color coordinate system.

In operation 1520, the processor 120 may determine whether the accuracy of character recognition for the image data of the segment is greater than a critical value. For example, the processor 120 may obtain the accuracy of character recognition through OCR performance.

In operation 1530, the processor 120 may determine the category of a segment as a raster image.

In operation 1540, the processor 120 may determine the category of a segment as text.

In operation 1550, the processor 120 may determine the category of a segment as a vector image. For example, image data included in the vector image may be characters, lines, or shapes in handwriting form.

Figure 16:
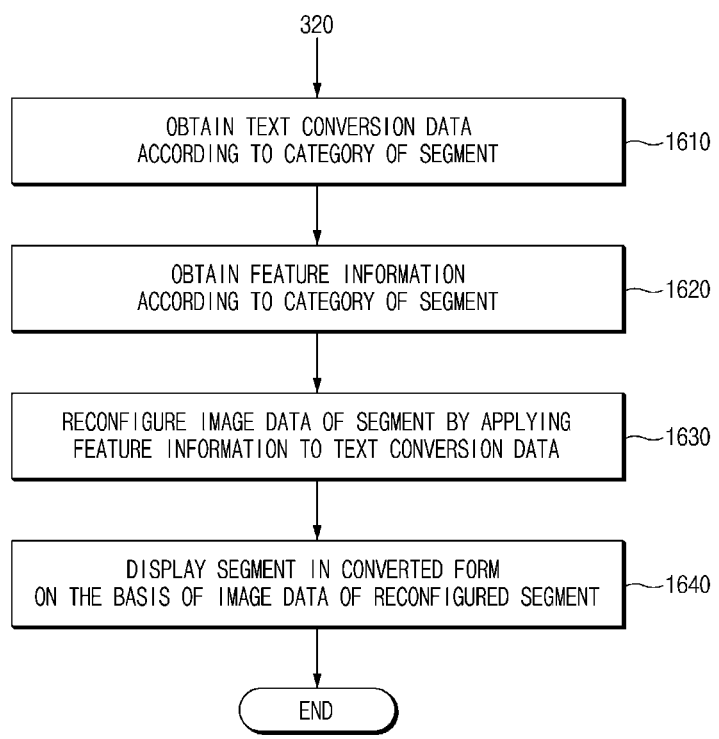
FIG. 16 is a flowchart illustrating a method of reconfiguring image data of a segment by applying feature information to converted data according to various embodiments of the present disclosure.

FIG. 16 is a flowchart illustrating a method of reconfiguring image data of a segment by applying a category and category based feature information to converted data according to various embodiments of the present disclosure.

Referring to FIG. 16, the method of reconfiguring image data of a segment by applying feature information to converted data shown in FIG. 16 may be included in operation 330 of FIG. 3. The method shown in FIG. 16 may be operations processed in the electronic device 101 of FIG. 1. Accordingly, although some content is omitted in this embodiment of the present disclosure, the above described content relating to the electronic device 101 of FIG. 1 is applied to the method shown in FIG. 16.

In operation 1610, the processor 120 may obtain data (for example, Unicode text data and vector data) that is converted from image data of a segment into a data type corresponding to the category of the segment.

In operation 1620, the processor 120 may obtain the feature information of the segment. The feature information may include at least one of the background, color, font, size, paragraph, underline, and table of the segment.

In operation 1630, the processor 120 may reconfigure the image data of the segment by applying the feature information to the converted data.

In operation 1640, the display 150 may display image data in a converted form based on the reconfigured image data.

Figure 17:
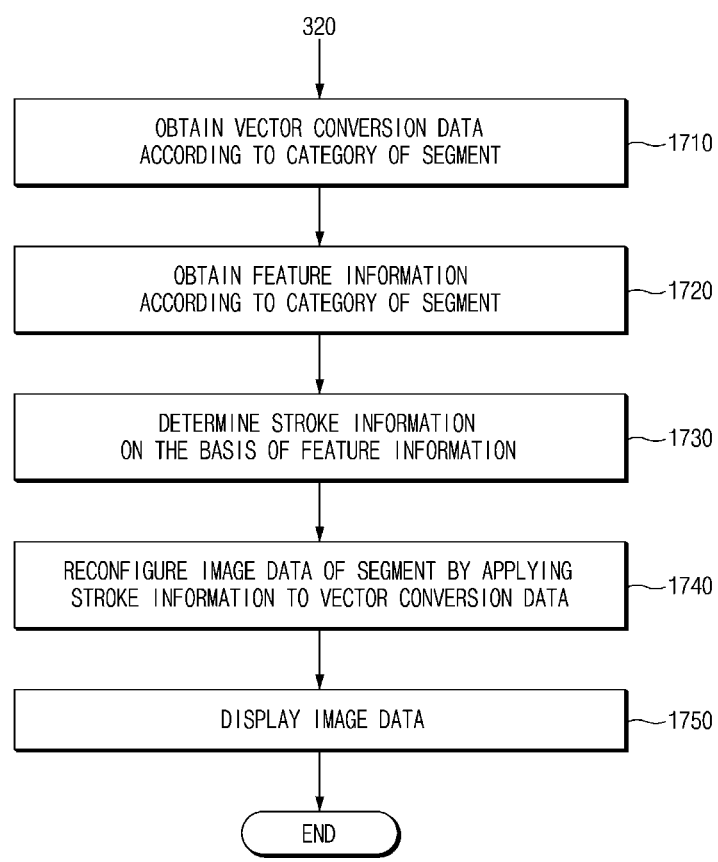
FIG. 17 is a flowchart illustrating a method of reconfiguring image data of a segment by applying stroke information to vector data according to various embodiments of the present disclosure.

FIG. 17 is a flowchart illustrating a method of reconfiguring image data of a segment by applying stroke information to vector data according to various embodiments of the present disclosure.

Referring to FIG. 17, the method of reconfiguring image data of a segment by applying stroke information to vector data shown in FIG. 17 may be included in operation 330 of FIG. 3. The method shown in FIG. 17 may be operations processed in the electronic device 101 of FIG. 1. Accordingly, although some content is omitted in this embodiment of the present disclosure, the above described content relating to the electronic device 101 of FIG. 1 is applied to the method shown in FIG. 17.

In operation 1710, the processor 120 may convert the image data of the segment into vector data corresponding to the category of a segment.

In operation 1720, the processor 120 may obtain the feature information of a stroke in the segment. For example, the feature information may include at least one of the thickness of a stroke, the forms of start points and end points, a thickness change value, a color change value, and material information.

In operation 1730, the processor 120 may determine stroke information based on the feature information. For example, the stroke information may include at least one of the type of a pen, a color, a thickness, a writing pressure, a writing speed, a tilt, and a rotation of the pen.

In operation 1740, the processor 120 may reconfigure the image data of the segment by applying the stroke information to the vector data.

In operation 1750, the display 150 may display the image data in a converted form based on the reconfigured image data of the segment.

Figure 18:
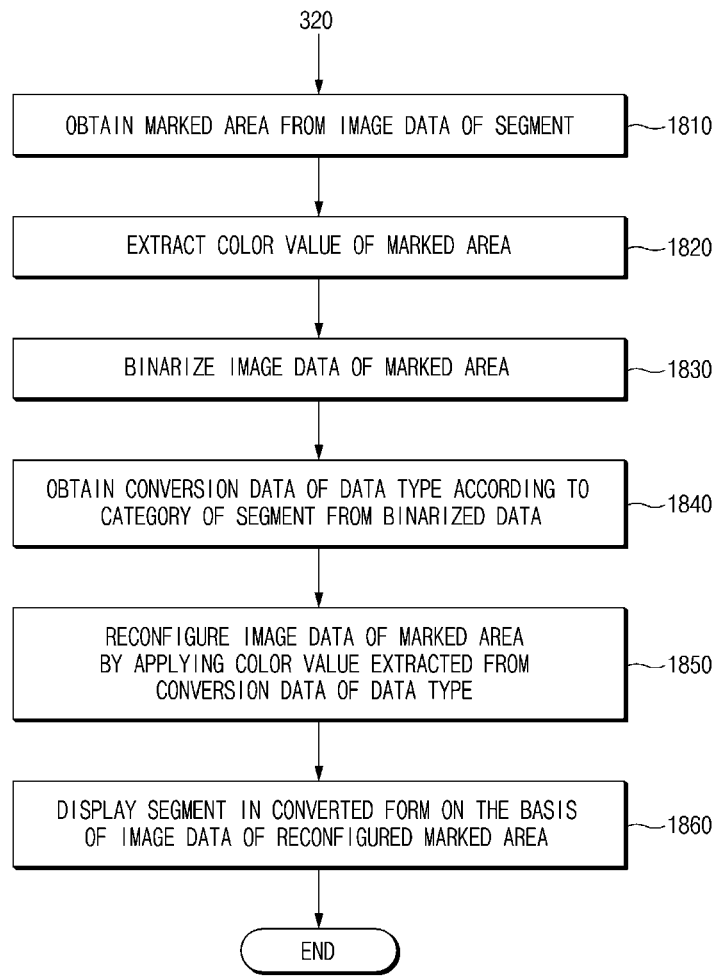
FIG. 18 is a flowchart illustrating a method of reconfiguring image data of a marked area according to various embodiments of the present disclosure.

FIG. 18 is a flowchart illustrating a method of reconfiguring image data of a marked area according to various embodiments of the present disclosure.

Referring to FIG. 18, the method of reconfiguring image data of a marked area shown in FIG. 18 may be included in operation 330 of FIG. 3. The method shown in FIG. 18 may be operations processed in the electronic device 101 of FIG. 1. Accordingly, although some content is omitted in this embodiment of the present disclosure, the above described content relating to the electronic device 101 of FIG. 1 is applied to the method shown in FIG. 18.

In operation 1810, the processor 120 may obtain a marked area from image data of a segment.

In operation 1820, the processor 120 may extract the color value of the marked area. The extracted color value may represent the color value of a mark.

In operation 1830, the processor 120 may binarize the image data of the marked area. The binarized data may represent data excluding a mark in the image data of the marked area.

In operation 1840, the processor 120 may obtain data converted from the binarized data to a data type corresponding to the category of the segment. The converted data may be an image (for example, a raster image), text data, or vector data.

In operation 1850, the processor 120 may reconfigure the image data of the marked area by applying the extracted color value to the converted data.

In operation 1860, the display 150 may display the image data in a converted form based on the reconfigured image data of the marked area.

Figure 19:
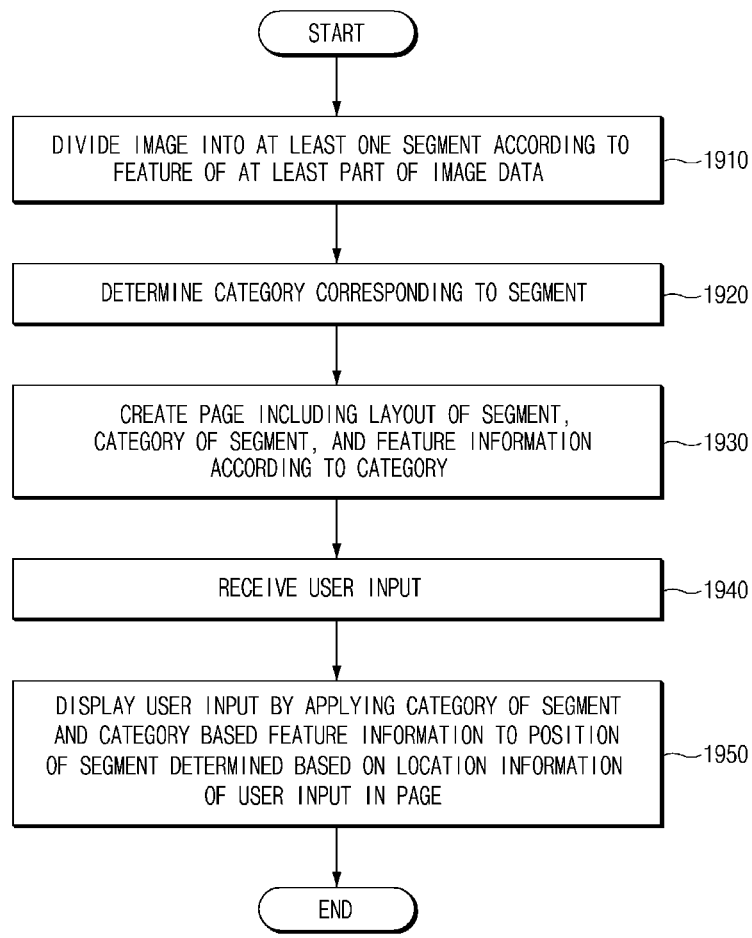
FIG. 19 is a view illustrating a method of creating a page including the layout of a segment, the category of the segment, and category based feature information according to various embodiments of the present disclosure.

FIG. 19 is a view illustrating a method of creating a page including the category of a segment and category based feature information according to various embodiments of the present disclosure.

Referring to FIG. 19, the method of creating a page including the category of a segment and feature information corresponding to the category shown in FIG. 19 is configured with operations processed in the electronic device 101 of FIG. 1. Accordingly, although some content is omitted in this embodiment of the present disclosure, the above described content relating to the electronic device 101 of FIG. 1 is applied to the method shown in FIG. 19.

In operation 1910, the processor 120 may divide image data into at least one segment.

In operation 1920, the processor 120 may determine the category of the segment and category based feature information corresponding to the feature of the image data of the segment. For example, the category of the segment may be determined by image, text, and vector image. For example, the feature information corresponding to the category of the segment may include at least one of the background, color, font, size, paragraph, underline, and table of the segment obtained corresponding to an analysis of the image data of the segment.

In operation 1930, the processor 120 may create a page including the layout of the segment, the category of the segment, and feature information corresponding to the category.

In operation 1940, the input/output interface 140 may receive a user input.

In operation 1950, the display 150 may display a user input by applying the category of the segment and the feature information corresponding to the category to the position of the segment determined based on the position information of the user input.

Figure 20A:
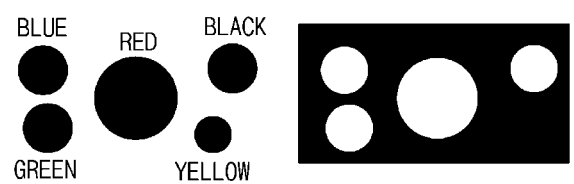
FIGS. 20A and 20B are views illustrating a method of determining whether image data of a segment includes a character through the color coordinate transformation of image data of a segment and an analysis of a pixel area corresponding to a specific channel according to various embodiments of the present disclosure.
Figure 20B:
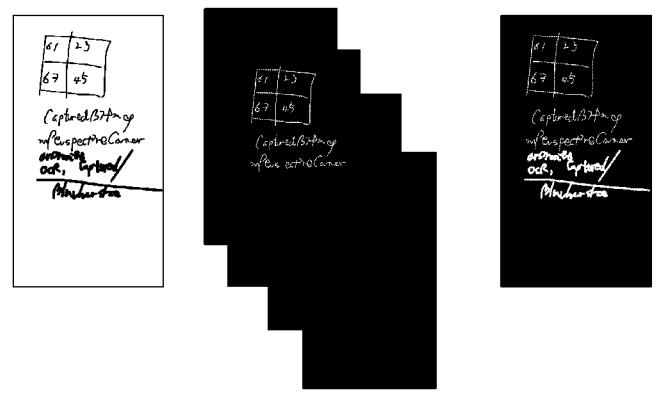

FIGS. 20A and 20B are views illustrating a method of determining whether image data of a segment includes a character through the color coordinate transformation of image data of a segment and an analysis of a pixel area corresponding to a specific channel according to various embodiments of the present disclosure.

Referring to FIG. 20A, the left of FIG. 20A is a circular image and the right of FIG. 20A may be data obtained by extracting a pixel of an RGBB channel from an image converted from an image into HEV color coordinate system. The processor 120 may extract only a pixel area (for example, a white area) corresponding to a Red, Green, Blue, Black channel as a target area. For example, after receiving image data in RGB form, the processor 120 may convert color coordinate system as HSV coordinate system. Even if saturation and brightness become changed, since a value of each channel is not changed, the HSV coordinate system may reduce a distortion due to shadow or lighting included in received image data by the conversion to the HSV coordinate system.

FIG. 20B represents a target area that extracts data obtained the conversion of color coordinate system through predetermined channels. The first image of FIG. 20B may be an original image. The middle image of FIG. 20B may be data extracted for each of R, G, blue (B), and black (B) and the right image of FIG. 20B may be data obtained by checking R, G, B, and B simultaneously and extracting pixels. The processor 120 may extract a pixel for each channel of each of R, G, B, and B as shown in the left of FIG. 20B or may extract pixels for R, G, B, and B simultaneously as shown in FIG. 20B. Accordingly, as shown in FIG. 20B, a target area configured with pixels corresponding to a specific channel may be extracted.

Referring to FIG. 20B, the processor 120 may determine whether the segment includes a character in a target area that extracts a pixel via at least one specific channel from image data obtained by the conversion of color coordinate system. For example, a percentage (for example, a ratio or a percentage that the number of pixels of a target area occupies with respect to the number of pixels in entire image data) that a target area occupies in an image area is calculated and when the calculated percentage is included in a specified critical range, it is determined that image data of a segment includes a character. For example, the specified critical range may be a value between about 0.5% and about 10.0%.

Alternatively, if the complexity (for example, the total sum of the sizes of obtained vector values) of a vector obtained by the vector conversion of each pixel in the target area is greater than a specified critical value, the processor 120 may determine that image data of a segment includes a character. For example, the specified critical value may be 100.

Alternatively, if the dispersion (that is, the standard deviation of a target area with respect to an image area) of a target area in an image area is less than a specified critical value, the processor 120 may determine that image data of a segment includes a character. For example, the specified critical value may be 60.

Such a method may be used for determining whether image data of a segment includes a character and also may be used for verifying a category determined by RGB distribution or edge pattern distribution.

Figure 21:
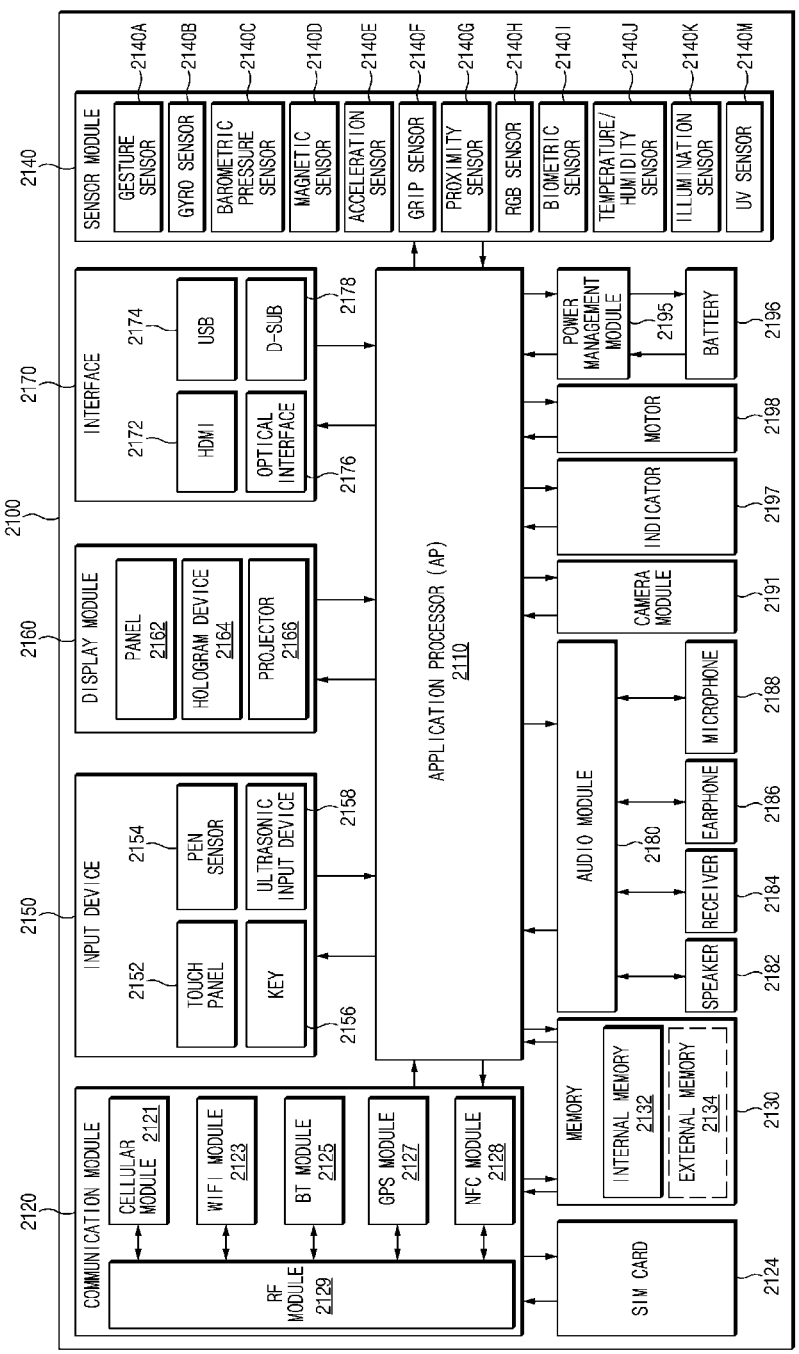
FIG. 21 is a block diagram of an electronic device according to various embodiments of the present disclosure.

FIG. 21 is a block diagram of an electronic device 2100 according to various embodiments of the present disclosure.

The electronic device 2100, for example, may include all or part of the electronic device 101 shown in FIG. 1. The electronic device 2100 may include at least one processor (for example, an AP 2110), a communication module 2120, a subscriber identification module (SIM) 2124, a memory 2130, a sensor module 2140, an input device 2150, a display 2160, an interface 2170, an audio module 2180, a camera module 2191, a power management module 2195, a battery 2196, an indicator 2197, and a motor 2198.

The AP 2110 may control a plurality of hardware or software components connected to the AP 2110 and also may perform various data processing and operations by executing an OS or an application program. The AP 2110 may be implemented with a system on chip (SoC), for example. According to an embodiment of the present disclosure, the AP 2110 may further include a graphic processing unit (GPU) (not shown) and/or an image signal processor (ISP). The AP 2110 may include at least part (for example, the cellular module 2121) of components shown in FIG. 21. The AP 2110 may load commands or data received from at least one of other components (for example, nonvolatile memory) and process them and may store various data in a nonvolatile memory.

The communication module 2120 may have the same or similar configuration to the communication interface 160 of FIG. 1. The communication module 2120 may include a cellular module 2121, a WiFi module 2123, a BT module 2125, a GPS module 2127, an NFC module 2128, and a radio frequency (RF) module 2129.

The cellular module 2121, for example, may provide voice call, video call, text service, or internet service through communication network. According to an embodiment of the present disclosure, the cellular module 2121 may perform a distinction and authentication operation on the electronic device 2100 in a communication network by using a SIM (for example, the SIM card 2124). According to an embodiment of the present disclosure, the cellular module 2121 may perform at least part of a function that the AP 2110 provides. According to an embodiment of the present disclosure, the cellular module 2121 may include a CP.

Each of the WiFi module 2123, the BT module 2125, the GPS module 2127, and the NFC module 2128 may include a processor for processing data transmitted/received through a corresponding module. According to an embodiment of the present disclosure, at least part (for example, at least one) of the cellular module 2121, the WiFi module 2123, the BT module 2125, the GPS module 2127, and the NFC module 2128 may be included in one integrated chip (IC) or IC package.

The RF module 2129, for example, may transmit/receive communication signals (for example, RF signals). The RF module 2129, for example, may include a transceiver, a power amp module (PAM), a frequency filter, a low noise amplifier (LNA), or an antenna. According to another embodiment of the present disclosure, at least one of the cellular module 2121, the WiFi module 2123, the BT module 2125, the GPS module 2127, and the NFC module 2128 may transmit/receive RF signals through a separate RF module.

The SIM 2124, for example, may include a card including a SIM and/or an embedded SIM and also may include unique identification information (for example, an integrated circuit card identifier (ICCID)) or subscriber information (for example, an international mobile subscriber identity (IMSI)).

The memory 2130 (for example, the memory 130) may include an internal memory 2132 or an external memory 2134. The internal memory 2132 may include at least one of a volatile memory (for example, dynamic random access memory (DRAM), static RAM (SRAM), synchronous DRAM (SDRAM)) and a non-volatile memory (for example, one time programmable read only memory (OTPROM), programmable ROM (PROM), erasable and programmable ROM (EPROM), electrically EPROM (EEPROM), mask ROM, flash ROM, flash memory (for example, not and (NAND) flash or not or (NOR) flash), hard drive, and solid state drive (SSD)).

The external memory 2134 may further include flash drive, for example, compact flash (CF), secure digital (SD), micro-SD, mini-SD, extreme digital (xD), multi media card (MMC) or a memorystick. The external memory 2134 may be functionally and/or physically connected to the electronic device 2100 through various interfaces.

The sensor module 2140 measures physical quantities or detects an operating state of the electronic device 2100, thereby converting the measured or detected information into electrical signals. The sensor module 2140 may include at least one of a gesture sensor 2140A, a gyro sensor 2140B, a barometric pressure sensor 2140C, a magnetic sensor 2140D, an acceleration sensor 2140E, a grip sensor 2140F, a proximity sensor 2140G, a color sensor 2140H (for example, a RGB sensor), a biometric sensor 2140I, a temperature/humidity sensor 2140J, an illumination sensor 2140K, and an ultraviolet (UV) sensor 2140M. Additionally or alternatively, the sensor module 2140 may include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 2140 may further include a control circuit for controlling at least one sensor therein. According to an embodiment of the present disclosure, the electronic device 2100 may further include a processor configured to control the sensor module 2140 as part of or separately from the AP 2110 and thus may control the sensor module 2140 while the AP 2110 is in a sleep state.

The input device 2150 may include a touch panel 2152, a (digital) pen sensor 2154, a key 2156, or an ultrasonic input device 2158. The touch panel 2152 may use at least one of capacitive, resistive, IR, or ultrasonic methods, for example. Additionally, the touch panel 2152 may further include a control circuit. The touch panel 2152 may further include a tactile layer to provide tactile response to a user.

The (digital) pen sensor 2154, for example, may include a sheet for recognition as part of a touch panel or a separate sheet for recognition. The key 2156 may include a physical button, an optical key, or a keypad, for example. The ultrasonic input device 2158 may detect ultrasonic waves generated from an input tool through a microphone (for example, the microphone 2188) in order to check data corresponding to the detected ultrasonic waves.

The display 2160 (for example, the display 150) may include a panel 2162, a hologram device 2164, or a projector 2166. The panel 2162 may have the same or similar configuration to the display 150 of FIG. 1. The panel 2162 may be implemented to be flexible, transparent, or wearable, for example. The panel 2162 and the touch panel 2152 may be configured with one module. The hologram 2164 may show three-dimensional images in the air by using the interference of light. The projector 2166 may display an image by projecting light on a screen. The screen, for example, may be placed inside or outside the electronic device 2100. According to an embodiment of the present disclosure, the display 2160 may further include a control circuit for controlling the panel 2162, the hologram device 2164, or the projector 2166.

The interface 2170 may include a HDMI 2172, a USB 2174, an optical interface 2176, or a D-subminiature (sub) 2178, for example. The interface 2170, for example, may be included in the communication interface 160 shown in FIG. 1. Additionally or alternatively, the interface 2170 may include a mobile high-definition link (MHL) interface, a SD card/MMC interface, or an infrared data association (IrDA) standard interface.

The audio module 2180 may convert sound into electrical signals and convert electrical signals into sounds. At least some components of the audio module 2180, for example, may be included in the input/output interface 145 shown in FIG. 1. The audio module 2180 may process sound information inputted/outputted through a speaker 2182, a receiver 2184, an earphone 2186, or a microphone 2188.

The camera module 2191, as a device for capturing a still image and a video, may include at least one image sensor (for example, a front sensor or a rear sensor), a lens, an ISP, or a flash (for example, an LED or a xenon lamp).

The power management module 2195 may manage the power of the electronic device 2100. According to an embodiment of the present disclosure, the power management module 2195 may include a power management integrated circuit (PMIC), a charger integrated circuit, or a battery or fuel gauge, for example. The PMIC may have a wired and/or wireless charging method. As the wireless charging method, for example, there is a magnetic resonance method, a magnetic induction method, or an electromagnetic method. An additional circuit for wireless charging, for example, a circuit such as a coil loop, a resonant circuit, or a rectifier circuit, may be added. The battery gauge may measure the remaining amount of the battery 2196, or a voltage, current, or temperature thereof during charging. The battery 2196, for example, may include a rechargeable battery and/or a solar battery.

The indicator 2197 may display a specific state of the electronic device 2100 or part thereof (for example, the AP 2110), for example, a booting state, a message state, or a charging state. The motor 2198 may convert electrical signals into mechanical vibration and may generate vibration or haptic effect. Although not shown in the drawings, the electronic device 2100 may include a processing device (for example, a GPU) for mobile TV support. A processing device for mobile TV support may process media data according to the standards such as digital multimedia broadcasting (DMB), digital video broadcasting (DVB), or media-FLO™.

According to various embodiments of the present disclosure, a method of processing image data of an electronic device may include dividing the image into at least one segment according to feature of at least part of image data, determining a category corresponding to the at least one segment, and displaying the at least one segment in a converted format based on the category.

According to various embodiments of the present disclosure, the determining of the category includes determining the category of the at least one segment based on at least one of a distribution pattern of an RGB value and a distribution pattern of an edge in the image data of the at least one segment.

According to various embodiments of the present disclosure, the determining of the category of the at least one segment may include obtaining a target area that extracts a pixel via at least one specific channel from the image data of the at least one segment and determining whether the image data of the at least one segment includes a character based on a percentage that the target area occupies in an image area of the at least one segment, the complexity of a vector obtained by the vector conversion of each pixel in the target area, and the dispersion of the target area in the image area.

According to various embodiments of the present disclosure, the determining of the category of the at least one segment may further include converting the color coordinate system of the image data of the at least one segment and the obtaining of the target area includes obtaining the target area from image data obtained by the conversion of the color coordinate system.

According to various embodiments of the present disclosure, the displaying of the at least one segment in the converted form may include obtaining data converted into a data type corresponding to the category of the at least one segment from the image data of the at least one segment, obtaining at least one feature information of the background, color, font, size, paragraph, underline, and table of the at least one segment corresponding to the image data of the at least one segment, and displaying the image data of the at least one segment in a reconfigured form of the image data of the at least one segment by applying the feature information to the data converted into the data type.

According to various embodiments of the present disclosure, the displaying of the at least one segment in the converted form may include converting the image data of the at least one segment into vector data corresponding to the category of the at least one segment, obtaining at least one feature information of the thickness of a stroke, the forms of start points and end points, a thickness change value, a color change value, and material information corresponding to an analysis of the image data of the at least one segment, determining at least one stroke information of the type of a pen, a color, a thickness, a writing pressure, a writing speed, a tilt, and a rotation of the pen based on the feature information, and displaying the image data of the at least one segment in a reconfigured form of the image data of the at least one segment by applying the stroke information to the vector data.

According to various embodiments of the present disclosure, the displaying of the at least one segment in the converted form may include obtaining a marked area from the image data of the at least one segment, extracting a color value of the marked area, binarizing the image data of the marked area, obtaining data converted into a data type corresponding to the category of the at least one segment from the binarized data, and displaying the image data of the marked area in a reconfigured form of the image data of the marked area by applying the extracted color value to the data converted into the data type.

According to various embodiments of the present disclosure, the method of processing image data of the electronic device may further include obtaining preview image data when an image sensor equipped with the electronic device is driven, displaying a guide generated based on an edge detected from the preview image data on a preview image displayed on the electronic device, and obtaining the image data by the image sensor and the displaying of the generated guide on the preview image may include, when the generated guide is changed more than a specified critical value and the change of more than the specified critical value is not maintained longer than a threshold time, maintaining a previously displayed guide on the preview image.

According to various embodiments of the present disclosure, the displaying of the generated guide on the preview image may include, if an edge is not detected from the preview image data, maintaining a previously displayed guide and retrying the edge detection of the preview image data after a specified threshold time.

According to various embodiments of the present disclosure, the displaying of the at least one segment in the converted form may include creating a page including the layout of the at least one segment, the category, and feature information corresponding to the category.

According to various embodiments of the present disclosure, the method of processing image data of the electronic device further includes receiving a user input and the displaying of the at least one segment in the converted form may include displaying the user input, where the category of the at least one segment and the feature information are applied, at a position of a segment determined based on the position information of the user input in the page.

According to various embodiments of the present disclosure, the method of processing image data of the electronic device may include obtaining the feature information including at least one of the background, color, font, size, paragraph, underline, and table of the at least one segment and the displaying of the at least one segment in the converted form may include converting the user input into a data type corresponding to the category of the at least one segment and displaying data converted into the data type where the feature information is applied at the position of the at least one segment.

According to various embodiments of the present disclosure, the method of processing image data of the electronic device may include obtaining the feature information including at least one of the thickness of a stroke in the at least one segment, the forms of start points and end points, a thickness change value, a color change value, and material information and determining at least one stroke information of the type of a pen, a color, a thickness, a writing pressure, a writing speed, a tilt, and a rotation of the pen based on the feature information and the displaying of the at least one segment in the converted form may include converting the user input into vector data corresponding to the category of the at least one segment and displaying the converted vector data where the stroke operation is applied at the position of the at least one segment.

According to various embodiments of the present disclosure, the method of processing image data of the electronic device may include receiving a user input and position information of the user input from at least one external electronic device functionally connected to the electronic device and displaying the user input, where the category of the at least one segment and the feature information are applied, at a position of a segment determined based on the position information of the user input in the page.

According to various embodiments of the present disclosure, the electronic device may include at least one processor for dividing image data into at least one segment corresponding to a feature of at least part of the image data, for determining a category corresponding to the at least one segment, and for converting the at least one segment based on the category of the at least one segment and a display for displaying the image data in a converted form.

According to various embodiments of the present disclosure, the at least one processor may determine the category of the at least one segment based on at least one of a distribution pattern of an RGB value and a distribution pattern of an edge in the image data of the at least one segment.

According to various embodiments of the present disclosure, the at least one processor may obtain a target area that extracts a pixel via at least one specific channel from the image data of the at least one segment and determines the category of the at least one segment based on a percentage that the target area occupies in an image area of the at least one segment, the complexity of a vector obtained by the vector conversion of each pixel in the target area, and the dispersion of the target area in the image area.

According to various embodiments of the present disclosure, the at least one processor obtains a marked area from the image data of the at least one segment, extracts a color value of the marked area, binarizes the image data of the marked area, obtains data converted into a data type corresponding to the category of the at least one segment from the binarized data, reconfigures the image data of the marked area by applying the extracted color value to the converted data, and obtains image data in the converted form based on the image data of the marked area in the reconfigured form.

According to various embodiments of the present disclosure, the electronic device may further include a camera module for obtaining preview image data and the image data, and the display displays a guide generated based on an edge detected from the preview image data and when the generated guide is changed more than a specified critical value and the change of more than the specified critical value is not maintained longer than a threshold time, the at least one processor maintains a previously displayed guide on the preview image.

According to various embodiments of the present disclosure, if an edge is not detected from the preview image data, the at least one processor may maintain a previously displayed guide and may retry the edge detection of the preview image data after a specified threshold time.

According to various embodiments of the present disclosure, the at least one processor may create a page including the layout of the at least one segment, the category of the at least one segment, and feature information corresponding to the category.

According to various embodiments of the present disclosure, the electronic device may further include a user interface for receiving a user input, the at least one processor may determine a segment based on the position information of the user input in the page and apply the category and the feature information to the user input, and the display may display the user input where the category and the feature information are applied at the position of the determined segment.

According to various embodiments of the present disclosure, the at least one processor may obtain the feature information including at least one of the background, color, font, size, paragraph, underline, and table of the at least one segment through an analysis of the image data of the at least one segment and convert the user input into a data type corresponding to the category of the data type and the display may display the data converted into the data type where the feature information is applied.

According to various embodiments of the present disclosure, the electronic device may obtain the feature information including at least one of the thickness of a stroke in the at least one segment, the forms of start points and end points, a thickness change value, a color change value, and material information, determine at least one stroke information of the type of a pen, a color, a thickness, a writing pressure, a writing speed, a tilt, and a rotation of the pen based on the feature information, convert the user input into vector data corresponding to the category of the at least one segment, and apply the stroke information to the vector data, and the display may display the vector data where the stroke information is applied.

According to various embodiments of the present disclosure, the electronic device may further include a communication interface for receiving a user input and position information of the user input from at least one external electronic device functionally connected to the electronic device and the at least one processor may determine a segment based on the position information of the user input in the page and apply the category and the feature information to the user input, and the display may display the user input where the category and the feature information are applied at the position of the determined segment.

An electronic device according to various embodiments of the present disclosure may recognize a non-standardized character or handwriting generated data as Unicode text or a stroke.

The electronic device may reconfigure the image data in a converted form in order to be similar to original image data as much as possible as reducing the total data amount of the recognized Unicode text or stroke.

Each of the above-mentioned components of the electronic device according to various embodiments of the present disclosure may be configured with at least one component and the name of a corresponding component may vary according to the kind of an electronic device. According to various embodiments of the present disclosure, an electronic device according to various embodiments of the present disclosure may include at least one of the above-mentioned components, may not include some of the above-mentioned components, or may further include another component. Additionally, some of components in an electronic device according to various embodiments of the present disclosure are configured as one entity, so that functions of previous corresponding components are performed identically.

The term "module" used in various embodiments of the present disclosure, for example, may mean a unit including a combination of at least one of hardware, software, and firmware. The term "module" and the term "unit", "logic", "logical block", "component", or "circuit" may be interchangeably used. A "module" may be a minimum unit or part of an integrally configured component. A "module" may be a minimum unit performing at least one function or part thereof. A "module" may be implemented mechanically or electronically. For example, "module" according to various embodiments of the present disclosure may include at least one of an application-specific integrated circuit (ASIC) chip performing certain operations, field-programmable gate arrays (FPGAs), or a programmable-logic device, all of which are known or to be developed in the future.

According to various embodiments of the present disclosure, at least part of a device (for example, modules or functions thereof) or a method (for example, operations) according to this disclosure, for example, as in a form of a programming module, may be implemented using an instruction stored in computer-readable storage media. When at least one processor (for example, the processor 120) executes an instruction, it may perform a function corresponding to the instruction. The non-transitory computer-readable storage media may include the memory 130, for example.

The non-transitory computer-readable storage media may include hard disks, floppy disks, magnetic media (for example, magnetic tape), optical media (for example, compact disc ROM (CD-ROM), and DVD), magneto-optical media (for example, floptical disk), and hardware devices (for example, ROM, RAM, or flash memory). Additionally, a program instruction may include high-level language code executable by a computer using an interpreter in addition to machine code created by a complier. The hardware device may be configured to operate as at least one software module to perform an operation of various embodiments of the present disclosure and vice versa.

A module or a programming module according to various embodiments of the present disclosure may include at least one of the above-mentioned components, may not include some of the above-mentioned components, or may further include another component. Operations performed by a module, a programming module, or other components according to various embodiments of the present disclosure may be executed through a sequential, parallel, repetitive or heuristic method. Additionally, some operations may be executed in a different order or may be omitted. Or, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of processing image data of an electronic device, the method comprising:
    dividing the image data into at least one segment corresponding to a feature of at least part of the image data;
    determining a category corresponding to the at least one segment;
    obtaining at least one feature information of the at least one segment corresponding to the category;
    converting the at least one segment into converted data of the category based on the at least one feature; and
    displaying the converted at least one segment,
    wherein the converting of the at least one segment into the converted data comprises:
        obtaining data based on the category and the at least one feature,
        generating new content based on the obtained data, and
        providing the new content as the converted data.

2. The method of claim 1, wherein the determining of the category comprises determining the category of the at least one segment based on at least one of a red, green, or blue (RGB) value distribution pattern and an edge distribution pattern in image data of the at least one segment.

3. The method of claim 1, wherein the determining of the category comprises:
    obtaining a target area that extracts a pixel via at least one feature channel from image data of the at least one segment, and
    determining whether the image data of the at least one segment comprises a character based on at least one of a ratio that the target area occupies in an image area of the at least one segment, a complexity of a vector obtained by a vector conversion of each pixel in the target area, or a dispersion of the target area in the image area.

4. The method of claim 3,
    wherein the determining of the category further comprises converting a color coordinate system of the image data of the at least one segment, and
    wherein the obtaining of the target area comprises obtaining the target area from image data obtained through the converting of the color coordinate system.

5. The method of claim 1,
    wherein the obtaining of the at least one feature information comprises obtaining at least one of a background, color, font, size, paragraph, underline, and or table of the at least one segment, if the category is text, and
    wherein the displaying of the converted at least one segment further comprises, if the category is text:
        displaying text as the converted data and the image data of the at least one segment in a reconfigured form.

6. The method of claim 1,
    wherein the obtaining of the at least one feature information comprises obtaining at least one of a thickness of a stroke, forms of start points and end points, a thickness change value, a color change value, or material information corresponding to an analysis of the image data of the at least one segment, if the category is a vector image, and
    wherein the converting of the at least one segment into the converted data further comprises, if the category is the vector image:
        converting image data of the at least one segment into vector data,
        determining at least one stroke information of a type of a pen, a color, a thickness, a writing pressure, a writing speed, a tilt, or a rotation of the pen based on the at least one feature information, and
        providing vector data based on the at least one stroke information as the converted data, and
    wherein the displaying of the converted at least one segment comprises, if the category is the vector image, displaying text as the converted data and the image data of the at least one segment in a reconfigured form.

7. The method of claim 1,
    wherein the converting of the at least one segment further comprises:
        obtaining a marked area from image data of the at least one segment,
        extracting a color value of the marked area,
        binarizing image data of the marked area, and
        obtaining data converted into a data type corresponding to the category of the at least one segment from the binarized data, and
    wherein the displaying of the converted at least one segment comprises displaying the image data of the marked area in a reconfigured form of the image data of the marked area by applying the extracted color value to the image data converted into the data type.

8. The method of claim 1, further comprising:
    obtaining preview image data when an image sensor equipped with the electronic device is driven;
    displaying a guide generated based on an edge detected from the preview image data on a preview image displayed on the electronic device; and
    obtaining the image data by the image sensor,
    wherein the displaying of the guide on the preview image comprises, when the generated guide is changed more than a specified critical value and the change of more than the specified value is not maintained longer than a threshold time, maintaining a guide previously displayed on the preview image.

9. The method of claim 8, further comprising, when an edge is not detected from the preview image data, maintaining a previously displayed guide and retrying a detection of an edge of the preview image data after a specified threshold time.

10. The method of claim 1, wherein the displaying of the converted at least one segment comprises creating a page including at least one of a layout of the converted at least one segment, the category, or the at least one feature information corresponding to the category.

11. The method of claim 10, further comprising:
    receiving a user input,
    wherein the displaying of the converted at least one segment comprises displaying the user input, where the category of the at least one segment and the at least one feature information are applied, at a position of a segment determined based on position information of the user input in the page.

12. The method of claim 11,
    wherein the obtaining of the at least one feature information comprises obtaining at least one of a background, color, font, size, paragraph, underline, or table of the at least one segment, if the category is text, and
    wherein the displaying of the converted at least one segment further comprises:
        converting the user input into a data type corresponding to the category of the at least one segment; and displaying data converted into the data type, where the at least one feature information is applied, at a position of the at least one segment.

13. The method of claim 11,
wherein the obtaining of the at least one feature information comprises obtaining at least one of a thickness of a stroke, forms of start points and end points, a thickness change value, a color change value, or material information in the at least one segment, if the category is a vector image, and
wherein the converting of the at least one segment into the converted data further comprises, if the category is the vector image
determining at least one stroke information of a type of a pen, a color, a thickness, a writing pressure, a writing speed, a tilt, or a rotation of the pen based on the at least one feature information, and
converting the user input into vector data corresponding to the category of the at least one segment, and
wherein the displaying of the converted at least one segment comprises displaying the converted vector data, where the stroke information is applied, at a position of the at least one segment.

14. The method of claim 10, further comprising:
receiving a user input and position information of the user input from at least one external electronic device functionally connected to the electronic device; and
displaying the user input, where the category of the at least one segment and the at least one feature information are applied, at a position of a segment determined based on the position information of the user input in the page.

15. An electronic device comprising:
at least one processor configured to:
divide image data into at least one segment corresponding to a feature of at least part of the image data,
determine a category corresponding to the at least one segment,
obtain at least one feature information of the at least one segment corresponding to the category,
convert the at least one segment into converted data of the category based on the at least one feature, and
display the converted at least one segment; and
a display configured to display the image data in a converted form
wherein, to convert the at least one segment into the converted data, the at least one processor is further configured to:
obtain data based on the category and the at least one feature,
generate new content based on the obtained data, and
provide the new content as the converted data.

16. The device of claim 15, wherein the at least one processor is further configured to determine the category of the at least one segment based on at least one of a red, green, and blue (RGB) value distribution pattern or an edge distribution pattern in image data of the at least one segment.

17. The device of claim 15, wherein the at least one processor is further configured to:
obtain a target area that extracts a pixel via at least one feature channel from image data of the at least one segment, and
determine whether the image data of the at least one segment comprises a character based on at least one of a percentage that the target area occupies in an image area of the at least one segment, a complexity of a vector obtained by a vector conversion of each pixel in the target area, or a dispersion of the target area in the image area.

18. The device of claim 15, wherein the at least one processor is further configured to:
obtain a marked area from image data of the at least one segment,
extract a color value of the marked area,
binarize image data of the marked area,
obtain data converted into a data type corresponding to the category of the at least one segment from the binarized data, and
control the display to display the image data of the marked area in a reconfigured form of the image data of the marked area by applying the extracted color value to the image data converted into the data type.

19. The device of claim 15, further comprising:
a camera configured to obtain preview image data and the image data,
wherein the at least one processor is further configured to
control the display to display a guide generated based on an edge detected from the preview image data on a preview image displayed on the electronic device, and
when the generated guide is changed more than a specified critical value and the change of more than the specified value is not maintained for longer than a threshold time, maintain a guide previously displayed on the preview image.

20. The device of claim 19, wherein the at least one processor, when an edge is not detected from the preview image data, is further configured to maintain a previously displayed guide and retries a detection of an edge of the preview image data after a specified threshold time.

21. The device of claim 15, wherein the at least one processor is further configured to create a page including at least one of a layout of the at least one segment, the category, or the at least one feature information corresponding to the category.

22. The device of claim 21, further comprising:
an input interface configured to receive a user input,
wherein the at least one processor is further configured to
determine a segment based on position information of the user input in the page and applies the category and the at least one feature information to the user input, and
control the display to display the user input, wherein the category and the at least one feature information are applied, at a position of the determined segment.

23. The device of claim 22,
wherein the at least one processor is further configured to:
obtain the at least one feature information by obtaining at least one of a background, color, font, size, paragraph, underline, or table of the at least one segment through an analysis of the image data of the at least one segment, if the category is text,
convert the user input into a data type corresponding to the category of the at least one segment, and
apply the at least one feature information to data converted into the data type, and
control the display to display the data type converted data where the at least one feature information is applied.

24. The method of claim 22,
wherein the at least one processor is further configured to:
obtain the at least one feature information by obtaining at least one of a thickness of a stroke, forms of start points and end points, a thickness change value, a color change value, or material information in the at least one segment, if the category is a vector image, determine at least one stroke information of a type of a pen, a color, a thickness, a writing pressure, a writing speed, a tilt, or a rotation of the pen based on the at least one feature information, convert the user input into vector data corresponding to the category of the at least one segment, and apply the stroke information to the vector data, and control the display to display the vector data where the stroke information is applied.

25. The device of claim 21, further comprising:

a communication interface configured to receive a user input and position information of the user input from at least one external electronic device functionally connected to the electronic device, wherein the at least one processor is further configured to:
determine a segment based on the position information of the user input in the page, and apply the category and the at least one feature information to the user input, and control the display to display the user input, where the category and the at least one feature information are applied, at a position of the determined segment.

* * * * *